(12) United States Patent
Iwamoto et al.

(10) Patent No.: US 9,386,263 B2
(45) Date of Patent: Jul. 5, 2016

(54) IMAGING APPARATUS INCLUDING FUNCTION FOR PERFORMING IMAGING IN ACCORDANCE WITH SETS OF IMAGING PARAMETERS CORRESPONDING TO PRE-REGISTERED IMAGING SCENES, AND METHOD AND RECORDING MEDIUM HAVING PROGRAM STORED THEREON FOR THE SAME

(71) Applicant: CASIO COMPUTER CO., LTD., Shibuya-ku, Tokyo (JP)

(72) Inventors: Kenji Iwamoto, Kokubunji (JP); Osamu Nojima, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 93 days.

(21) Appl. No.: 14/252,080

(22) Filed: Apr. 14, 2014

(65) Prior Publication Data

US 2014/0218566 A1 Aug. 7, 2014

Related U.S. Application Data

(62) Division of application No. 12/977,784, filed on Dec. 23, 2010, now Pat. No. 8,736,703, which is a division of application No. 11/974,732, filed on Oct. 16, 2007, now abandoned.

(30) Foreign Application Priority Data

Oct. 16, 2006 (JP) .................................. 2006-281656
Dec. 28, 2006 (JP) .................................. 2006-355942

(51) Int. Cl.
*H04N 5/235* (2006.01)
*H04N 5/907* (2006.01)
(Continued)

(52) U.S. Cl.
CPC ........... *H04N 5/907* (2013.01); *H04N 1/32128* (2013.01); *H04N 5/232* (2013.01);
(Continued)

(58) Field of Classification Search
CPC ..... H04N 5/232; H04N 5/235; H04N 5/2356; H04N 5/2351; H04N 5/2352; H04N 5/2353; H04N 5/238; H04N 5/243
See application file for complete search history.

(56) References Cited

U.S. PATENT DOCUMENTS 5,828,793 A 10/1998 Mann
6,687,400 B1 2/2004 Szeliski
(Continued)

FOREIGN PATENT DOCUMENTS

JP 2005-354165 A 12/2005
JP 2006-261915 A 9/2006
(Continued)

OTHER PUBLICATIONS

Korean Office Action (and English translation thereof) dated Oct. 31, 2008, issued in a counterpart Korean Application.
(Continued)

*Primary Examiner* — Nicholas Giles
(74) *Attorney, Agent, or Firm* — Holtz, Holtz & Volek PC

(57) ABSTRACT

When a continuous imaging mode is set, a screen is displayed for allowing input of a number of images to shoot and the imaging parameters for each of the images, a determination is made as to whether the number of images to shoot and the imaging parameters for each of the images have been input by the user. When the number of images to shoot and the imaging parameters for each of the images have been input, the input number of images and the imaging parameters are stored, and a direct image display is started. Moreover, when there is an imaging instruction, a continuous imaging process is started in which still imaging is performed continuously based on the stored number of images and the imaging parameters. When the continuous imaging process has been completed, the plurality of still image data, obtained with differing imaging parameters, is recorded.

6 Claims, 20 Drawing Sheets

(51) Int. Cl.
*H04N 1/32* (2006.01)
*H04N 5/232* (2006.01)
*H04N 5/77* (2006.01)
*H04N 9/82* (2006.01)
*H04N 101/00* (2006.01)

(52) U.S. Cl.
CPC ............ *H04N 5/2352* (2013.01); *H04N 5/772* (2013.01); *H04N 9/8205* (2013.01); *H04N 2101/00* (2013.01); *H04N 2201/0084* (2013.01); *H04N 2201/3252* (2013.01); *H04N 2201/3259* (2013.01)

(56) References Cited

U.S. PATENT DOCUMENTS

| | | | |
|---|---|---|---|
| 7,110,032 | B2 | 9/2006 | Furukawa |
| 7,142,723 | B2 | 11/2006 | Kang et al. |
| 7,433,591 | B2 | 10/2008 | Eun |
| 7,508,438 | B2 * | 3/2009 | Okamoto ............... H04N 5/232 348/222.1 |
| 7,511,735 | B2 | 3/2009 | Uchida |
| 7,518,638 | B2 | 4/2009 | Furukawa |
| 2003/0081140 | A1 | 5/2003 | Furukawa |
| 2003/0234876 | A1* | 12/2003 | Bloom ................... H04N 5/772 348/231.3 |
| 2006/0044444 | A1* | 3/2006 | Okamoto ............... H04N 5/232 348/333.05 |
| 2006/0139470 | A1 | 6/2006 | McGowan |
| 2006/0215043 | A1 | 9/2006 | Furukawa |
| 2006/0216016 | A1* | 9/2006 | Eun ....................... G03B 17/02 396/222 |
| 2007/0013790 | A1* | 1/2007 | Nakase ................. H04N 5/772 348/231.99 |
| 2008/0036870 | A1 | 2/2008 | Uezono |

FOREIGN PATENT DOCUMENTS

| | | |
|---|---|---|
| JP | 2007-258927 A | 10/2007 |
| KR | 2006-0102134 A | 9/2006 |

OTHER PUBLICATIONS

Japanese Office Action dated Mar. 15, 2011 (and English translation thereof) in counterpart Japanese Application No. 2006-355942.

* cited by examiner

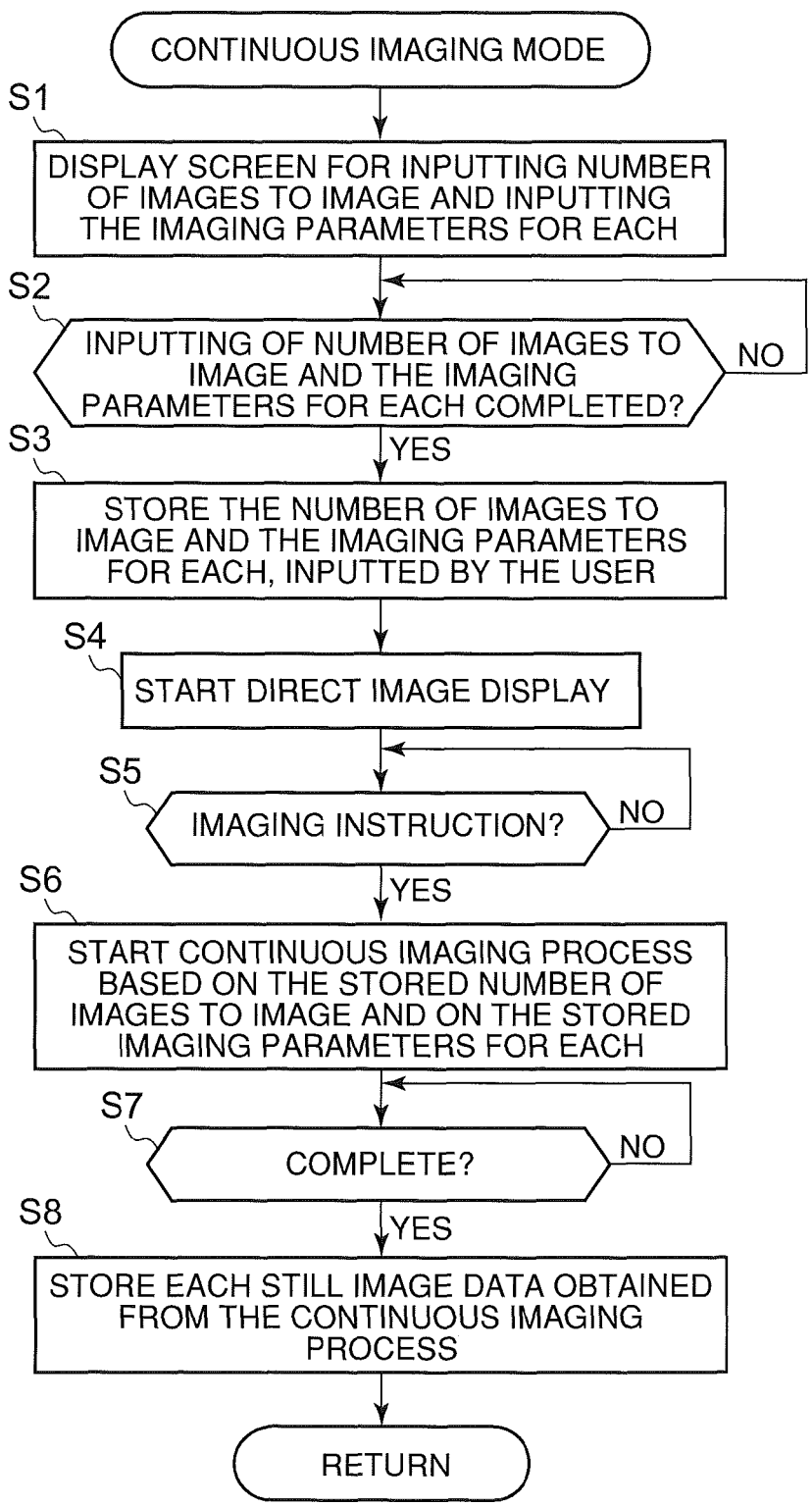

FIG. 3A

| | SCENE | SHUTTER SPEED | IRIS | EV SHIFT | COLOR EMPHASIS | WHITE BALANCE | COLOR SATURATION | ... |
|---|---|---|---|---|---|---|---|---|
| 1 | PEOPLE | — | — | — | — | — | — | ... |
| 2 | FLOWERS | — | — | — | — | — | — | ... |
| ⋮ | ⋮ | ⋮ | ⋮ | ⋮ | ⋮ | ⋮ | ⋮ | ⋮ |

| | SCENE | TITLE | EXPLANATION | SAMPLE IMAGE |
|---|---|---|---|---|
| 1 | PEOPLE | PHOTOGRAPHING PEOPLE | SETS THE COLOR EMPHASIS TO SKIN TONE AND CAUSES AN ATTRACTIVE DE-FOCUSING OF THE BACKGROUND ON THE DISTANT SIDE | SAMPLE IMAGE DATA |
| 2 | FLOWERS | PHOTOGRAPHING FLOWERS | SETS THE MACRO MODE, AND SETS A HIGH COLOR SATURATION | SAMPLE IMAGE DATA |
| ⋮ | ⋮ | ⋮ | ⋮ | ⋮ |

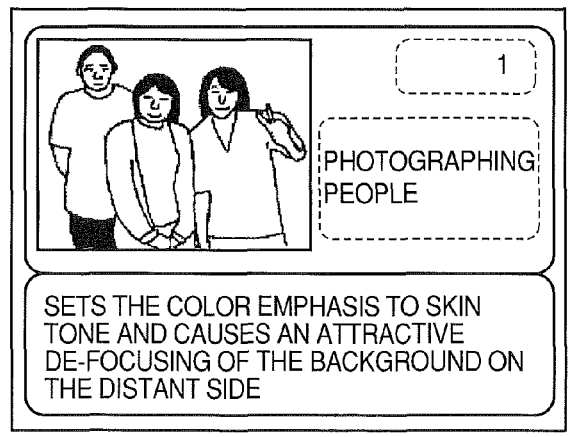

FIG. 7

| | 1 | 2 | 3 | 4 | 5 | 6 | 7 | 8 | 9 | 10 | 11 | 12 | 13 | |
|---|---|---|---|---|---|---|---|---|---|---|---|---|---|---|
| | PEOPLE | SCENERY | SCENERY AND PEOPLE | CHILDREN | PETS | CANDLE-LIGHT | PARTY | SPORTS | FLOWERS | MAKES GREENS LOOK NATURAL | FALL FOLIAGE | SMOOTHES THE FLOW OF WATER | STOPS WATER WHEN SPLASHING | ... |
| PEOPLE | | | | | | | | | | × | × | | | ... |
| SCENERY | | | | | | | | | | | | | | ... |
| SCENERY AND PEOPLE | | | | | | | | | | | | | | ... |
| CHILDREN | | | | | | | | | | | | × | | ... |
| PETS | | | | | × | | | | | | | | | ... |
| CANDLE-LIGHT | | | | | | × | | × | | × | | | | ... |
| PARTY | | | | | | × | | | | × | | | | ... |
| SPORTS | | | | | | | × | | | | | × | × | ... |
| FLOWERS | | | | | | | | | | | | | | ... |
| MAKES GREENS LOOK NATURAL | | | | × | | × | | | | | | | | ... |
| FALL FOLIAGE | | | | | | | | | | | | | | ... |
| SMOOTHES THE FLOW OF WATER | | | | | | | | × | | | | | × | ... |
| STOPS WATER WHEN SPLASHING | | | | | | | | | | | | | | ... |
| ... | ... | ... | ... | ... | ... | ... | ... | ... | ... | ... | ... | ... | ... | |

| IMAGING SCENE | | GROUP | | | | |
|---|---|---|---|---|---|---|
| | | A | B | C | D | ... |
| 1 | PEOPLE | ○ | | | | ... |
| 2 | SCENERY | | ○ | | | ... |
| 3 | SCENERY AND PEOPLE | ○ | | | | ... |
| 4 | CHILDREN | ○ | | | | ... |
| 5 | PETS | | | | | ... |
| 6 | CANDLELIGHT | | | | | ... |
| 7 | PARTY | | | | | ... |
| 8 | SPORTS | | | | | ... |
| 9 | FLOWERS | | | | | ... |
| 10 | MAKES GREENS LOOK NATURAL | | ○ | | | ... |
| 11 | FALL FOLIAGE | | ○ | | | ... |
| 12 | SMOOTHES THE FLOW OF WATER | | | | ○ | ... |
| 13 | STOPS WATER WHEN SPLASHING | | | | ○ | ... |
| 14 | SUNSET | | | | | ... |
| 15 | NIGHTSCAPE | | | ○ | | ... |
| 16 | SOFT FOCUS | ○ | | | | ... |
| 17 | BACKLIGHTING | ○ | | | | ... |
| 18 | HIGH SENSITIVITY | | | ○ | | ... |
| 19 | PASTEL | | | | | ... |
| 20 | ILLUSTRATION | | | | | ... |
| | ⋮ | ⋮ | ⋮ | ⋮ | ⋮ | |

FIG. 9

| IMAGING SCENE | DETERMINATION ITEMS | | | | | |
|---|---|---|---|---|---|---|
| | BRIGHTNESS | HUE | TYPE OF LIGHT SOURCE | MOTION OF SUBJECT | PRESENCE/ ABSENCE OF FACE | ... |
| 1 PEOPLE | — | — | — | — | — | ... |
| 2 SCENERY | — | — | — | — | — | ... |
| 3 SCENERY AND PEOPLE | — | — | — | — | — | ... |
| 4 CHILDREN | — | — | — | — | — | ... |
| 5 PETS | — | — | — | — | — | ... |
| 6 CANDLELIGHT | — | — | — | — | — | ... |
| 7 PARTY | — | — | — | — | — | ... |
| 8 SPORTS | — | — | — | — | — | ... |
| 9 FLOWERS | — | — | — | — | — | ... |
| 10 MAKES GREENS LOOK NATURAL | — | — | — | — | — | ... |
| 11 FALL FOLIAGE | — | — | — | — | — | ... |
| 12 SMOOTHES THE FLOW OF WATER | — | — | — | — | — | ... |
| 13 STOPS WATER WHEN SPLASHING | — | — | — | — | — | ... |
| 14 SUNSET | — | — | — | — | — | ... |
| 15 NIGHTSCAPE | — | — | — | — | — | ... |
| ... | ... | ... | ... | ... | ... | |

| SELECTED SCENE | | NEW IMAGING PARAMETERS | IMAGING PARAMETERS DURING CONTINUOUS IMAGING |
|---|---|---|---|
| BASE SCENE (IMAGING PARAMETERS) | COMPOSITE SCENE (IMAGING PARAMETERS) | | |
| "SMOOTHES THE FLOW OF WATER" | "PEOPLE" | "SMOOTHES THE FLOW OF WATER + PEOPLE" | "SMOOTHES THE FLOW OF WATER" "STOPS WATER WHEN SPLASHING" |
| "STOPS WATER WHEN SPLASHING" | | "STOPS WATER WHEN SPLASHING + PEOPLE" | "SMOOTHES THE FLOW OF WATER+PEOPLE" "STOPS WATER WHEN SPLASHING+PEOPLE" |

FIG. 19

| | IMAGING SCENE | ADJUSTMENT PARAMETERS | ADJUSTMENT INCREMENT | NUMBER OF ADJUSTMENTS |
|---|---|---|---|---|
| 1 | PEOPLE | SKIN TONE EMPHASIS | — | — |
| 2 | SCENERY | SHARPNESS | — | — |
| 3 | SCENERY AND PEOPLE | SHARPNESS | — | — |
| 4 | CHILDREN | SKIN TONE EMPHASIS | — | — |
| 5 | PETS | SHUTTER SPEED | — | — |
| 6 | CANDLELIGHT | WHITE BALANCE ADJUSTMENT | — | — |
| 7 | PARTY | SHUTTER SPEED | — | — |
| 8 | SPORTS | SHUTTER SPEED | — | — |
| 9 | FLOWERS | COLOR SATURATION | — | — |
| 10 | MAKES GREENS LOOK NATURAL | GREEN EMPHASIS | — | — |
| 11 | FALL FOLIAGE | RED EMPHASIS | — | — |
| 12 | SMOOTHES THE FLOW OF WATER | SHUTTER SPEED | — | — |
| 13 | STOPS WATER WHEN SPLASHING | SHUTTER SPEED | — | — |
| 14 | SUNSET | FILTER (RED) | — | — |
| 15 | NIGHTSCAPE | SHUTTER SPEED | — | — |
| 16 | SOFT FOCUS | DE-FOCUSING ADJUSTMENT | — | — |
| 17 | BACKLIGHTING | EV CORRECTION LEVEL | — | — |
| 18 | HIGH SENSITIVITY | SENSITIVITY | — | — |
| 19 | PASTEL | CHANGE COLOR EMPHASIS | — | — |
| 20 | ILLUSTRATION | EDGE EMPHASIS | — | — |
| | ⋮ | ⋮ | ⋮ | ⋮ |

108

IMAGING APPARATUS INCLUDING FUNCTION FOR PERFORMING IMAGING IN ACCORDANCE WITH SETS OF IMAGING PARAMETERS CORRESPONDING TO PRE-REGISTERED IMAGING SCENES, AND METHOD AND RECORDING MEDIUM HAVING PROGRAM STORED THEREON FOR THE SAME

CROSS-REFERENCE TO RELATED APPLICATIONS

This is a Divisional of U.S. application Ser. No. 12/977,784, filed Dec. 23, 2010, which is a Divisional of U.S. application Ser. No. 11/974,732, filed Oct. 16, 2007, which is based on Japanese Patent Application No. 2006-281656, filed Oct. 16, 2006, and Japanese Patent Application No. 2006-355942, filed Dec. 28, 2006, the entire contents of all of which are incorporated herein by reference.

BACKGROUND OF THE INVENTION

1. Field of the Invention

The present invention relates generally to an imaging apparatus, a continuous imaging method, and a recording medium for recording a program, and more specifically, the present invention relates to an imaging apparatus that performs continuous still imaging, a continuous imaging method that performs continuous still imaging, and a recording medium for recording a program that performs continuous still imaging.

2. Description of the Related Art

In the prior art, there are imaging apparatus, such as digital cameras, provided with autobracket (autobracketing) functions that enable continuous imaging at each step while stepwise or incrementally changing predetermined imaging parameter set values, such as exposure levels, such as disclosed in Unexamined Japanese Patent Application KOKAI Publication No. 2005-354165.

SUMMARY OF THE INVENTION

However, in the prior art autobracketing function, the imaging parameters that are varied during imaging are limited to predetermined imaging parameters, such as exposure levels, so that the changes in image quality between the plurality of images obtained as a result of imaging are no more than monotonic changes based thereon. As a result, it is not possible for a user to obtain a plurality of images with more diverse changes in image quality.

Moreover, when one considers the benefits of the autobracket function, it is desirable to provide a plurality of modes with different imaging parameters wherein there are stepwise or incremental changes in the setting values, and to be able to select, in advance of the bracketing imaging, the imaging parameters for which there are stepwise changes in the setting values. However, in such a case, it is not possible for a user who lacks a certain degree of knowledge regarding cameras and photography, etc., to determine which of the imaging parameters would be effective to change, and thus such a user would not be able to use the autobracket function effectively.

The present invention provides a unique solution to the disadvantages of the prior art autobracketing functions and an object thereof is to provide an imaging apparatus, and still imaging program, capable of significantly increasing the ease-of-use when performing bracketing imaging.

An imaging apparatus in accordance with the present invention includes:

imaging sections for imaging a subject;

continuous shooting control sections for controlling the imaging sections so as to image a plurality of still images at different timings;

a setting section for setting each of the imaging parameters for imaging each of the still images;

a recording section for recording image data; and a recording control section for controlling the recording, by the recording section, of each image data obtained by imaging each still image with different timing, by the imaging sections through the control of the continuous shooting control sections. The continuous shooting control sections image multiple still images with different timing based on the respective different imaging parameters set by the setting section.

A continuous imaging method in accordance with the present invention includes:

setting each of the imaging parameters for still imaging a plurality of times;

performing imaging of multiple still images, with different timing, based on the respective different imaging parameters set by the setting step; and controlling each image data obtained by each still imaging performed with different timings.

A recording medium for recording a program in accordance with the present invention, that causes a computer having an imaging apparatus including imaging sections for imaging a subject and a recording section for recording image data, to perform the functions of:

setting a plurality of imaging parameters when the imaging sections images the subject;

performing continuous shooting control such that the imaging section images multiple still images with different timing based on the respective different, set imaging parameters; and controlling the recording, by the recording section, of each image data obtained by imaging each still image with different timing, by the imaging sections through the control of the continuous shooting.

A second embodiment of an imaging apparatus in accordance with the present invention includes:

a parameter recording section for recording a plurality of imaging parameters corresponding to a plurality of imaging scenes registered in advance;

single-shot control sections for controlling single-shot imaging based on an imaging parameter corresponding to a single imaging scene, recorded in the parameter recording section;

a selection section for selecting a plurality of imaging scenes from the plurality of imaging scenes;

a generation section for generating new imaging parameters based on a plurality of an imaging parameter corresponding respectively to a plurality of imaging scenes selected by the selection section;

continuous shooting control sections for controlling continuous shooting imaging based on the plurality of an imaging parameter generated by the generation section; and an image recording control section for controlling the recording of a still image obtained by the imaging sections during single-shot imaging by the single-shot control sections and a plurality of still images obtained by the imaging sections during continuous shooting by the continuous shooting control sections.

A second embodiment of a continuous imaging method in accordance with the present invention for an imaging apparatus having imaging sections for imaging a subject and a parameter recording section for recording a plurality of sets of imaging parameters corresponding to each of a plurality of imaging scenes registered in advance, includes:

controlling single-shot imaging based on an imaging parameter corresponding to a single imaging scene, stored in the parameter recording section;

selecting a plurality of imaging scenes from the plurality of imaging scenes;

generating new imaging parameter based on a plurality of imaging parameters corresponding respectively to a plurality of selected imaging scenes;

controlling continuous shooting imaging based on the plurality of generated imaging parameters; and controlling the recording of a still image obtained by the imaging sections during single-shot imaging and a plurality of still images obtained by the imaging sections during continuous shooting imaging.

A second embodiment of a recording medium for recording a program in accordance with the present invention, that causes a computer having an imaging apparatus including imaging sections for imaging a subject, a parameter recording section for recording a plurality of imaging parameters corresponding to each of a plurality of imaging scenes registered in advance, and a selection section for selecting a plurality of imaging scenes from the plurality of imaging scenes, to perform the functions of:

controlling single-shot imaging based on an imaging parameter corresponding to a single imaging scene, stored in the parameter recording section;

generating new imaging parameter based on a plurality of imaging parameters corresponding respectively to a plurality of selected imaging scenes;

controlling continuous shooting imaging based on the plurality of generated imaging parameters; and controlling the recording of a still image obtained by the imaging sections during single-shot imaging and a plurality of still images obtained by the imaging sections during continuous shooting imaging.

A third embodiment of an imaging apparatus in accordance with the present invention, includes:

imaging sections for imaging a subject;

a parameter recording section for recording a plurality of combinations of first and second imaging parameter corresponding to an imaging scene;

a selection control section for allowing the user to select any given imaging scene from the plurality of imaging scenes;

single-shot control sections for controlling single-shot imaging based on a first imaging parameter corresponding to an imaging scene selected by a user using the selection control section and recorded in the parameter recording section;

continuous shooting control sections for controlling bracketing imaging based on a second imaging parameter corresponding to an imaging scene selected by a user using the selection control section, recorded in the parameter recording section; and an image storing control section for controlling the recording of a still image obtained by the imaging sections during single-shot imaging by the single-shot control sections and a plurality of still images obtained by the imaging sections during bracketing imaging by the continuous shooting control sections.

A third embodiment of a continuous shooting method in accordance with the present invention for an imaging apparatus having imaging sections for imaging a subject and a parameter recording section for recording a plurality of first and second imaging parameters corresponding to each of a plurality of imaging, includes:

allowing the user to select any given imaging scene from the plurality of imaging scenes;

controlling single-shot imaging based on a first imaging parameter corresponding to an imaging scene selected by a user and recorded in the parameter recording section;

controlling bracketing imaging based on a second imaging parameter corresponding to an imaging scene selected by a user and stored in the parameter recording section;

controlling the recording of a still image obtained by the imaging sections during single-shot imaging and a plurality of still images obtained by the imaging sections during bracketing shooting imaging.

A third embodiment of a recording medium for recording a program in accordance with the present invention, that causes a computer having an imaging apparatus including imaging sections for imaging a subject and a parameter recording section for recording a plurality of first and second imaging parameters corresponding to each of a plurality of imaging, to perform the functions of:

controlling single-shot imaging based on a first imaging parameter corresponding to an imaging scene selected by a user and stored in the parameter recording section;

controlling bracketing imaging based on a second imaging parameter corresponding to an imaging scene selected by a user and recorded in the parameter recording section;

controlling the recording of a still image obtained by the imaging sections during single-shot imaging and a plurality of still images obtained by the imaging sections during bracketing imaging.

BRIEF DESCRIPTION OF THE DRAWINGS

These objects and other objects and advantages of the present invention will become more apparent upon reading of the following detailed description and the accompanying drawings in which:

FIG. 2 is a flowchart illustrating a first embodiment of the operation of a digital camera in accordance with the invention;

FIG. 3A illustrates the imaging parameter data of each imaging scene recorded in the memory in FIG. 1;

FIG. 3B illustrates appended information data of each imaging scene recorded in the memory in FIG. 1;

FIG. 3C illustrates the situation when displaying the imaging scene;

FIG. 7 is a conceptual diagram illustrating the content of selection limitation data;

FIG. 8 is a conceptual diagram illustrating the content of group data;

FIG. 9 is a conceptual diagram illustrating the content of scene determination data;

FIG. 18 is a conceptual diagram illustrating an example of imaging parameters corresponding to a base scene and a composite scene, imaging parameters that are produced and imaging parameters used during continuous imaging;

FIG. 19 is a conceptual diagram illustrating an alternative detail of bracketing data.

DETAILED DESCRIPTION

The embodiments of imaging apparatus in accordance with the invention will be described in detail, referencing the accompanying drawings wherein a digital camera is used as an example of an imaging apparatus.

First Embodiment

Structure of the Digital Camera

Figure 1:
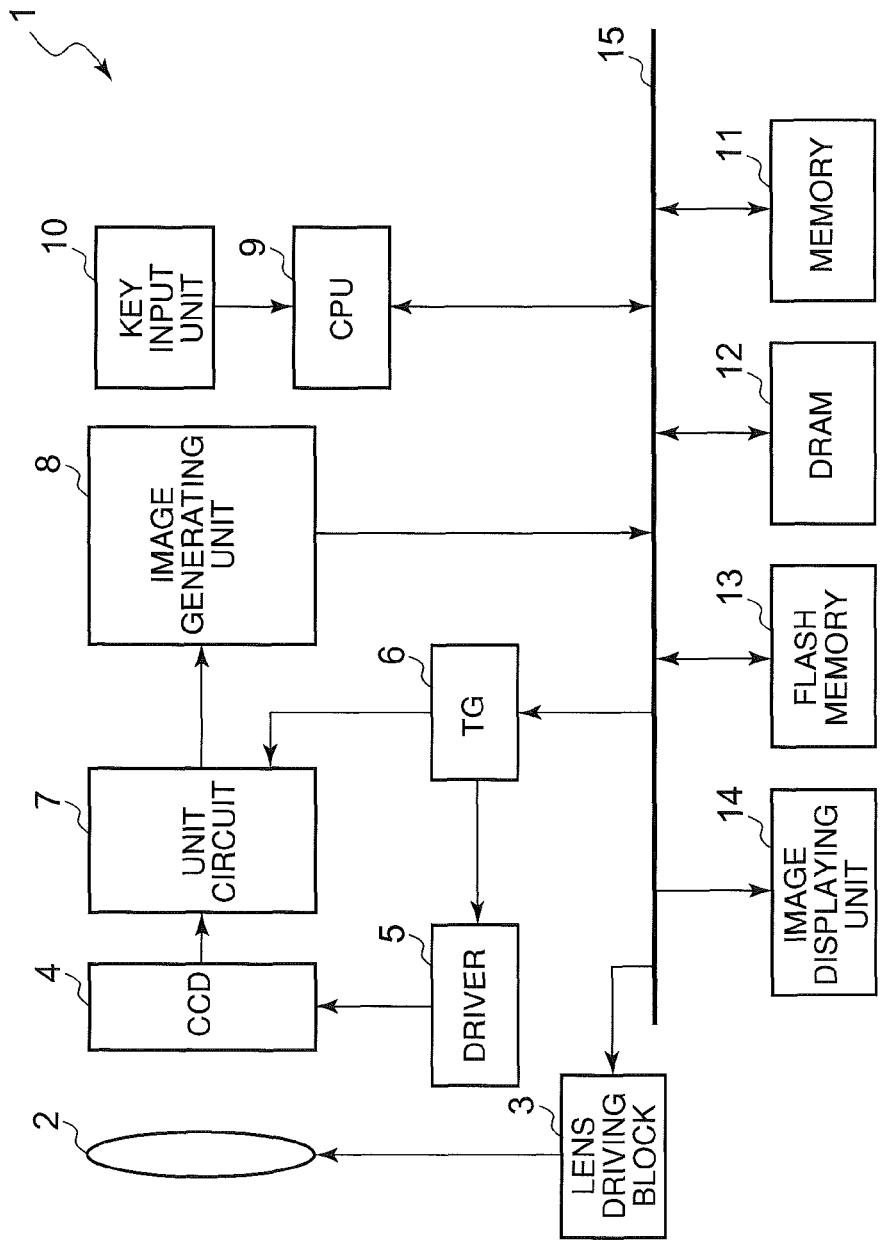
FIG. 1 is a block diagram of a digital camera according to the present invention.

FIG. 1 is a block diagram illustrating the electrical schematic structure of a digital camera 1 that embodies the imaging apparatus in accordance with the present invention. The digital camera 1 is provided with an imaging lens 2, a lens driving block 3, a CCD 4, a driver 5, a timing generator (TG) 6, a unit circuit 7, an image generating unit 8, a central processing unit (CPU) 9, a key input unit 10, a memory 11, a dynamic RAM (DRAM) 12, a flash memory 13, an image display unit 14, and a bus 15.

The imaging lens 2 includes a focusing lens and a zoom lens, not shown, and is connected to the lens driving block 3. The lens driving block 3 includes a focusing motor and a zoom motor, not shown, for driving, in the directions of the respective optical axes, the focusing lens and the zoom lens, and a focusing motor driver and zoom motor driver, not shown, for driving the focusing motor and zoom motor in the directions of the respective optical axes, in response to control signals from the CPU 9.

The CCD 4 (the imaging element) is driven by the driver 5 to perform opto-electric conversion of the intensities of the different colors of light for the RGB values of the subject at specific intervals, and output these as image signals to the unit circuit 7. The operating timing of this driver 5 and the unit circuit 7 is controlled by the CPU 9 through the TG 6. The CCD 4 may include a Bayer array color filter, and also can function as an electronic shutter. The shutter speed of this electronic shutter is controlled by the CPU 9 through the driver 5 and the TG 6.

The TG 6 is connected to the unit circuit 7, which comprises a CDS (Correlated Double Sampling) circuit that performs correlated double sampling and latches the image signals output from the CCD 4, an AGC (Automatic Gain Control) circuit that performs automatic gain control on the image signal after the sampling thereof, and an A/D converter for converting the analog image signal after the automatic gain control into a digital signal, where the image signals output from the CCD 4 are sent to the image generating unit 8 as digital signals through the unit circuit 7.

The image generating unit 8 performs processes such as correction processes and white balance processes on the image data that is sent from the unit circuit 7, and also generates luminance and color-difference signals (YUV data), and sends the image data, i.e., the generated luminance and color-difference signals, to the CPU 9. Thus, the image generating unit 8 performs image processing on the image data output from the CCD 4.

The CPU 9 performs the function of recording the image data that is sent from the image generating unit 8, and is also a monolithic microcontroller for controlling each unit in the digital camera 1. In particular, the CPU 9 performs a function (a direct display control section) for displaying on the image display unit 14, video obtained through video imaging using the CCD 4; a function (a continuous shooting control section) for performing continuous still imaging using the CCD 4; a function (a setting section) for setting imaging parameters for each imaging in the continuous imaging; and a function (a recording control section) for controlling, to the flash memory 13, each image data obtained through the continuous imaging.

The key input unit 10 (input section or selection section) includes a plurality of operating keys such as a power supply ON/OFF key, a mode switching key, a shutter button, a + key, a SET key, a SEND key, a DELETE key, and a CANCEL key, whereby operating signals are sent to the CPU 9 in response to key operations by the user. Control programs and data necessary for the CPU 9 to control each unit are recorded in the memory 11, and the CPU 9 operates according to these programs.

The DRAM 12 is used as a buffer memory 11 for temporarily storing the image data sent to the CPU 9 after imaging by the CCD 4, and is also used as the working memory 11 for the CPU 9. The flash memory 13 is a recording medium for saving compressed image data.

The image display unit 14 includes a color LCD and the driving circuitry thereof, and displays, as a direct image, the subject that has been imaged by the CCD 4 when in imaging standby mode, and displays a video of the subject that has been imaged by the CCD 4 during video imaging. Moreover, when a still imaging process has been performed during video imaging, the still image that has been imaged is displayed along with the video.

Operation of the Digital Camera 1

A first embodiment of the operation of a digital camera 1 will be explained below following the flowchart in FIG. 2.

When the continuous imaging mode is set by the user operating the mode switching key, the CPU 9 displays, on the image display unit 14, a screen for inputting the number of images to shoot and the imaging parameters for each (Step S1). In this context, the term "imaging parameters" refers to the entire set of imaging parameters such as focus control, shutter speed, iris, EV shift, filter, white balance (WB), color emphasis, and the like, and a screen is displayed for inputting the imaging parameters for each image.

Next, the CPU 9 determines whether the inputting of the number of images to shoot and the imaging parameters for each of the images has been completed (Step S2). The user is able to observe the screen that is displayed in Step S1 and to operate the + key, and the like, to input the number of images to shoot, and also to input, for each image, the imaging parameters considered to be appropriate to the current imaging conditions. In other words, a plurality of patterns of imaging parameters considered to be appropriate to the current imaging conditions can be input. For example, when 3 is input as the number of images to shoot, then imaging parameters can be input for each image, such as the imaging parameters for the first image, the imaging parameters for the second image, and the imaging parameters for the third image, whereby the user operates the SET key when the user believes that the inputting of the number of images to shoot and the imaging parameters for each has been completed.

This input procedure is desirable because there is not necessarily a single set of imaging parameters that can be considered appropriate to the current imaging conditions, but rather it is not clear which imaging parameters are best until the imaging is actually performed and the results are observed.

Moreover, when the CPU 9 determines that an operating signal corresponding to the SET key operation has been sent from the key input unit 10, the CPU 9 determines that the inputting of the number of images to shoot and of the imaging parameters for each has been completed. Each of the imaging parameters that is input can be input through directly inputting values, or the values can be input through selecting "Auto." When Auto has been selected, the CPU 9, at the time of imaging, automatically sets the imaging parameters for which Auto has been input. This determination determines the imaging parameters based on the image data imaged immediately prior to the time of imaging.

If it is determined that the inputting of the number of images to shoot and the imaging parameters for each image has not been completed (S2: NO), then the CPU 9 repeats the process in Step S2 until there is a determination that the inputting has been completed. If it is determined that the inputting of the number of images to shoot and the imaging parameters for each image has been completed (S2: YES), then the CPU 9 stores the input number of images to shoot and the input imaging parameters for each into the imaging parameter storage area of the buffer memory (DRAM 12) (Step S3) (the setting section). Thus, the input plurality of patterns of imaging parameters are set as the imaging parameters for each imaging in the continuous imaging.

Next, the CPU 9 starts imaging, at a predetermined frame rate using the CCD 4, and stores, into the buffer memory, the image data that are output sequentially from the CCD 4 and for which the luminance and color-difference signals are generated sequentially by the image generating unit 8, and starts the so-called direct image display, i.e., starts displaying this stored image data on the image display unit 14 (Step S4) (direct display control section). Next, the CPU 9 determines whether there has been an instruction from the user to perform imaging (Step S5). The CPU 9 determines whether this imaging instruction has been performed based on whether an operating signal corresponding to the depression of the shutter button has been sent from the key input unit 10.

If it is determined that an imaging instruction has not been performed (S5: NO), then the CPU 9 repeats the process in Step S5 until the imaging instruction is performed. On the other hand, if it is determined that an imaging instruction has been performed (S5: YES), then the CPU 9 starts the continuous imaging process based on the number of images to shoot and on the imaging parameters for each that were stored in Step S3 (Step S6) (continuous shooting control section).

Specifically, when, for example, "3" is stored as the number of images to shoot, a continuous imaging process is started wherein a still imaging process is performed under the first imaging parameters that are stored, followed by a still imaging process performed under the second imaging parameters that are stored, followed by a still imaging process performed under the third imaging parameters that are stored. The still image data obtained through this imaging process is stored sequentially into the buffer memory. Thus, the respective still imaging processes are performed using the plurality of input patterns of imaging parameters. When set to "Auto," the imaging parameters are determined based on the image data imaged immediately prior to the imaging instruction having been performed.

When the continuous imaging process is started, the CPU 9 determines whether the continuous imaging process has been completed (Step S7). If it is determined that the continuous imaging process has not been completed (S7: NO), then the CPU 9 repeats the process in Step S7 until the continuous imaging process has been completed. When it is determined that the continuous imaging process has been completed (S7: YES), then the CPU 9 stores, into the flash memory 13, each of the still image data obtained by the continuous imaging process (Step S8) (recording control section). In this manner, images imaged under a plurality of imaging parameters, thought to be appropriate for the imaging conditions, are stored, enabling the user to obtain a desired image.

As described above, in this embodiment, the user inputs a plurality of patterns of imaging parameters thought to be appropriate for the current imaging conditions, and a continuous still imaging process is performed based on the input plurality of patterns of imaging parameters, thereby enabling the user to obtain a desired image from the plurality of still image data that is obtained. Thus, when simply a single set of imaging parameters is input so as to match the current imaging conditions and a still image is shot, if the still image data obtained is not the image desired by the user (i.e., if the image is flawed), then it is necessary to shoot the image again, which cannot deal with a situation wherein, for example, there is no second imaging opportunity. However, with the present invention, several sets of imaging parameters thought to be suitable to the current imaging conditions are input and a continuous imaging process is performed under the plurality of input imaging parameters, which not only enables the user to obtain the predetermined plurality of candidate images easily, but also enables the user to select therefrom the image that is truly desired.

The following alternate example is also possible for the first embodiment described above. Although in the embodiment described above the imaging parameters were input when performing continuous imaging, instead a plurality of patterns of imaging parameters that have been input and for which continuous imaging has been performed may be stored in the memory 11 as a single group. Moreover, when a plurality of patterns of imaging parameters are stored in the memory 11 in advance as a single group, and that group is selected, continuous imaging may be performed using the plurality of patterns of imaging parameters belonging to that group. At this time, the user may input a desired name for the group name. For example, inputting a group name such as "Nighttime photography" corresponding to a group of imaging parameters corresponding to nighttime imaging enables continuous shooting with various imaging parameters corresponding to nighttime imaging by selecting the "Nighttime photography" group when, at some later time, imaging is performed at night. This can reduce the amount of work involved in inputting the plurality of patterns of imaging parameters at the time of continuous shooting. Moreover, the imaging parameters in the imaging parameters that belong to the stored group may be changed.

Second Embodiment

In the first embodiment described above, various imaging parameters were set by the user inputting the imaging parameters, and the digital camera 1 performed continuous imaging based on each of the imaging parameters. However, in the second embodiment, the user may select, as desired, an imaging scene corresponding to a set of imaging parameters having each of the imaging parameters that have been determined in advance to correspond to the subject to be imaged, and the digital camera 1 may performed continuous imaging under the imaging parameters corresponding to the selected imaging scene.

The structure of the digital camera in the second embodiment is identical to the structure of the digital camera 1 set forth in the first embodiment.

However, imaging parameter data 103 that includes imaging parameters (shutter speed, iris, color enhancement, etc.) corresponding to predetermined imaging scenes, and appended information data 104 including titles, explanations thereof, and sample image data for each of the imaging scenes are stored in the memory 11. Furthermore, each of the imaging scenes has a number associated therewith, where the imaging scenes are displayed in order of these numbers.

FIG. 3A illustrates the content of the imaging parameter data 103. A set of imaging parameters such as a shutter speed, an iris, EV shift, a color enhancement, is stored for each imaging scene number.

FIG. 3B illustrates the content of the appended information data 104. For each imaging scene number, a title indicating the content of the imaging scene, such as "Photographing people," an explanation of the imaging scene, such as "Sets the color enhancement to skin-tone and causes an attractive de-focusing of the background on the distant side," and sample image data are stored.

By viewing the titles or explanations of imaging scenes, or sample images of imaging scenes, the user will be able to make multiple selections of (candidate) imaging scenes the user considers to be appropriate to the imaging conditions, and can perform continuous imaging under the imaging parameters corresponding to the plurality of selected imaging scenes.

FIG. 3C shows a screen when an imaging scene, stored in the memory 11, is displayed on the image display unit 14.

As shown in FIG. 3C, a sample image, a scene title, and an explanation are displayed. A portion of the appended information 104 data read out from the memory based on the imaging scene (number) that has been selected is displayed in this detail display. The number shown at the upper right is the number for the imaging scene currently displayed.

Figure 4:
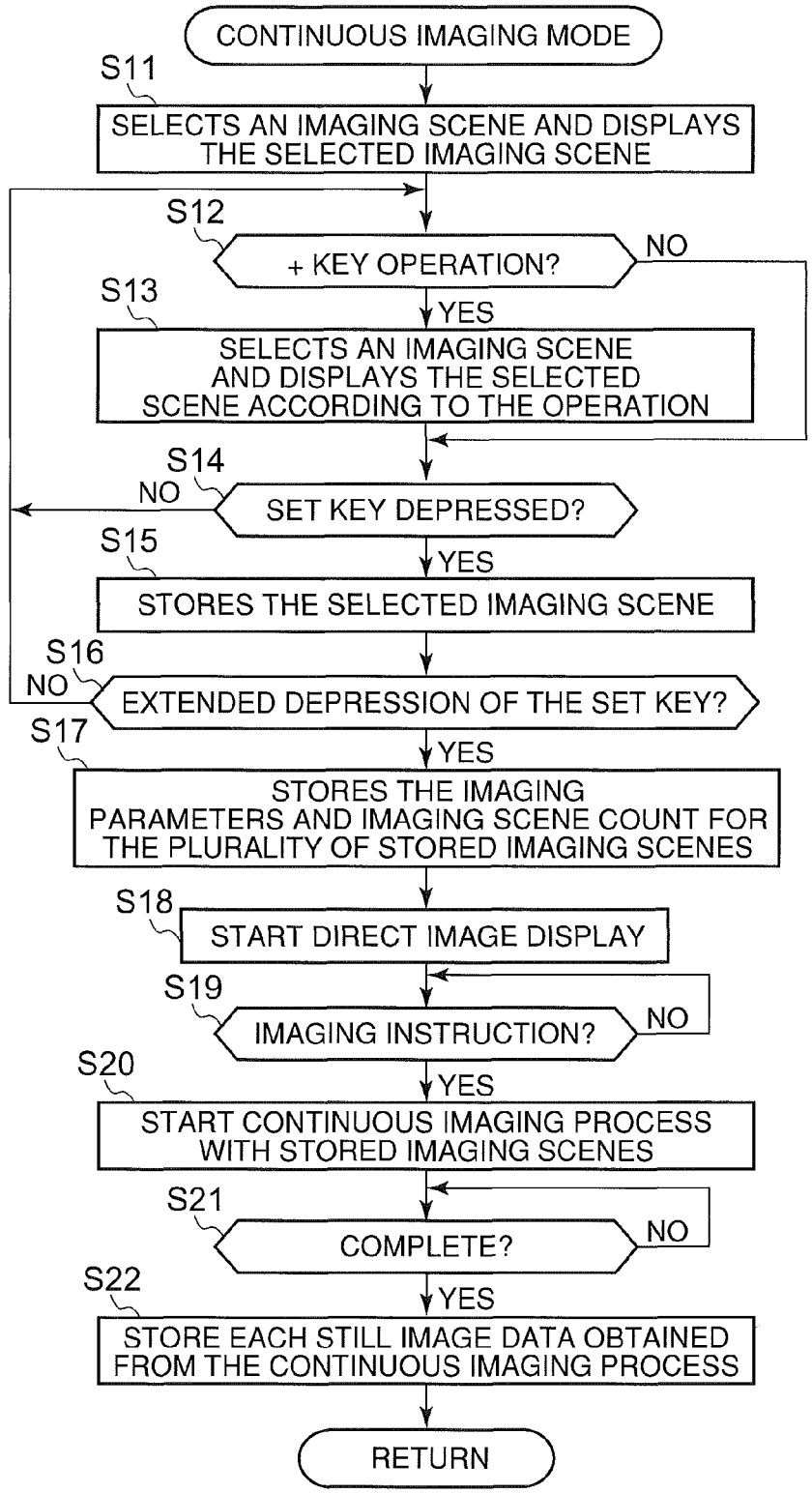
FIG. 4 is a flowchart illustrating a second embodiment of the operation of a digital camera in accordance with the invention.

The operation of a digital camera 1 as set forth in the second embodiment will be explained below following the flowchart in FIG. 4. When the continuous imaging mode is set through a user operation of the mode switching key, the CPU 9 selects the first imaging scene stored in the memory 11 (the imaging scene with the number "1"), and displays the selected imaging scene (Step S11).

Next, the CPU 9 determines whether there has been an operation of the + key (Step S12). At this time, the CPU 9 determines whether there has been an operation of the + key based on whether an operating signal corresponding to the operation of the + key has been sent from the key input unit 10. If it is determined that there has been an operation of the + key (S12: YES), then the CPU 9 selects a new imaging scene in accordance with the operation, displays the selected imaging scene (Step S13), and advances the processing to Step S14. Thus, the imaging scene that is selected and displayed is changed. For example, when the "↓" key of the + key is operated in a state wherein imaging scene 2 is selected, then imaging scene 3 will be selected and displayed, and similarly, when the "↑" key of the + key is operated in a state wherein imaging scene 2 is selected, then imaging scene 1 will be selected and displayed.

If the last number is selected and the "↓" key of the + key is operated, or if the first number (number 1) imaging scene is selected and the "↑" key is operated, then either the selection and display may be left unchanged because there is no next number in response to the operation, or the first number and the last number may be connected so as to select and display the next number in response to the operation. Thus, when the "↓" key is operated when the imaging scene with the last number is selected, then the imaging scene with the first number may be selected and displayed, and similarly, when the "↑" key is operated in a state wherein the imaging scene with the first number is selected, then the imaging scene with the last number may be selected and displayed.

On the other hand, if it is determined that there has not been an operation of the + key (S12: NO), then the CPU 9 advances the processing to Step S14. In Step S14, the CPU 9 determines whether the SET key has been depressed. This determination is made based on whether an operating signal corresponding to the depression of the SET key has been sent from the key input unit 10. Here the user depresses the SET key to select the desired imaging scene.

If it is determined that the SET key has not been depressed (S14: NO), then the CPU 9 returns the processing to Step S12. If it is determined that the SET key has been depressed (S14: YES), then the CPU 9 advances the processing to Step S15. The CPU 9 stores into the buffer memory the number of the imaging scene currently selected (Step S15). That is, by depressing the SET key, the user can set the selection of the imaging scene for imaging.

Next, the CPU 9 determines whether or not the depression operation of the SET key is an extended depression (Step S16). This determination is made based on whether the operating signal corresponding to the depression of the SET key, or in other words, the operating signal that is indicated from the time of the depression until the time at which the depression is released, has been sent for more than a predetermined time interval. If it is determined that the SET key has not had an extended depression (S16: NO), then the CPU 9 returns the processing to Step S12.

Thus, the user is able to select any number of imaging scenes thought to be appropriate to the current imaging conditions, and can modify the selections, prior to performing an extended depression of the SET key. For example, the user is able to select multiple imaging scenes that are the same as or near to the current imaging conditions if the user thinks that there are multiple imaging scenes (for example, "Nightscape" and "Fireworks", and the like) that apply or nearly apply. The number of images to be continuously imaged through the continuous imaging process is determined depending on the number of imaging scenes that have been selected.

On the other hand, if it is determined that there has been an extended depression of the SET key (S16: YES), then the CPU 9 reads out, from the imaging parameter data in the memory 11, the imaging parameters corresponding to the numbers of each of the imaging scenes currently selected, and stores these parameters in the imaging parameter storage area of the buffer memory, and also stores the number of imaging scenes that have been selected (Step S17) (setting section). Thus, the imaging parameters of the selected plurality of imaging scenes are set as the imaging parameters for each imaging in the continuous imaging. The number of stored imaging scenes corresponds, without modification, to the number of images to be imaged through continuous imaging. When the imaging parameters of the imaging scenes are stored, the storage is performed through associating imaging scene numbers and imaging parameters.

Thereafter, the CPU 9 starts a process that images the subject, using the CCD 4, and that displays a direct image of the subject (Step S18). When the direct image display has started, the CPU 9 determines whether there has been an instruction from the user to perform imaging (Step S19). If it is determined that an imaging instruction has not been performed (S19: NO), then the CPU 9 repeats the process in Step S19 until the imaging instruction is performed. If it is determined that an imaging instruction has been performed (S19: YES), then the CPU 9 starts the continuous imaging process based on the number of images (image count) to shoot and on the imaging parameters for each image (imaging) that were stored in Step S17 (Step S20).

Specifically, a process is started so as to perform a continuous imaging process under the imaging parameters of each of the imaging scenes sequentially, starting with the imaging scene with the lowest number such that, of the imaging scene numbers (imaging scene numbers) associated with each of the imaging parameters stored in the imaging parameter storage area, the still imaging process is performed under the imaging parameters for the smallest imaging scene number, followed by the still imaging process performed under the imaging parameters for the next smallest imaging scene number, and so forth. Thus, the respective still imaging processes are performed using the imaging parameters of the plurality of selected imaging scenes. Alternatively, the continuous imaging process may be performed starting with the largest imaging scene number. Also, the continuous imaging process may be performed in the sequence with which the imaging scenes were selected by the user. Moreover, the continuous imaging process may be performed by selecting the imaging scene numbers at random.

Next, the CPU 9 determines whether the continuous imaging process has been completed (Step S21). If it is determined that the continuous imaging process has not been completed (S21: NO), then the CPU 9 repeats the process in Step S21 until the process has been completed. When it is determined that the continuous imaging process has been completed (S21: YES), then the CPU 9 stores, into the flash memory 13, the plurality of the still image data obtained by the continuous imaging process (Step S21). At this time, the imaging scene information indicating the imaging scene under which the imaging was performed (for example, the imaging scene number or the imaging scene title, etc.) is stored in association with each of the image data that is stored.

As described above, in this second embodiment, a plurality of imaging scenes thought to be suitable to the current imaging conditions is selected by the user, and a continuous imaging process is performed based on the plurality of imaging scenes that has been selected, enabling the user to select with ease a plurality of desired candidate images, and also to select the image that is actually desired.

Third Embodiment

While in the second embodiment described above, the user selected the imaging scenes, in a third embodiment, the digital camera 1 may automatically select a plurality of imaging scenes in response to the current imaging conditions (the current imaging environment).

Operation of the Digital Camera 1

The digital camera in the third embodiment has a structure identical to that in the first embodiment. However, as with the second embodiment, imaging parameter data that stores, in advance, imaging parameters corresponding to predetermined imaging scenes, and a plurality of appended information data comprising titles, explanations, and sample image data for each of the imaging scenes is stored in the memory 11.

Next, in the third embodiment, the CPU 9 has a process (a detection section) for detecting the imaging conditions such as the brightness of the subject, the color tone of the subject, the amount of movement of the subject, and the like, based on the image data currently being imaged. The brightness of the subject is detected based on the luminance component of the image data, the color tone of the subject is detected based on each of the R, G, and B color components, and the amount of motion of the subject is detected based on a calculation of, for example, the motion vector.

Figure 5:
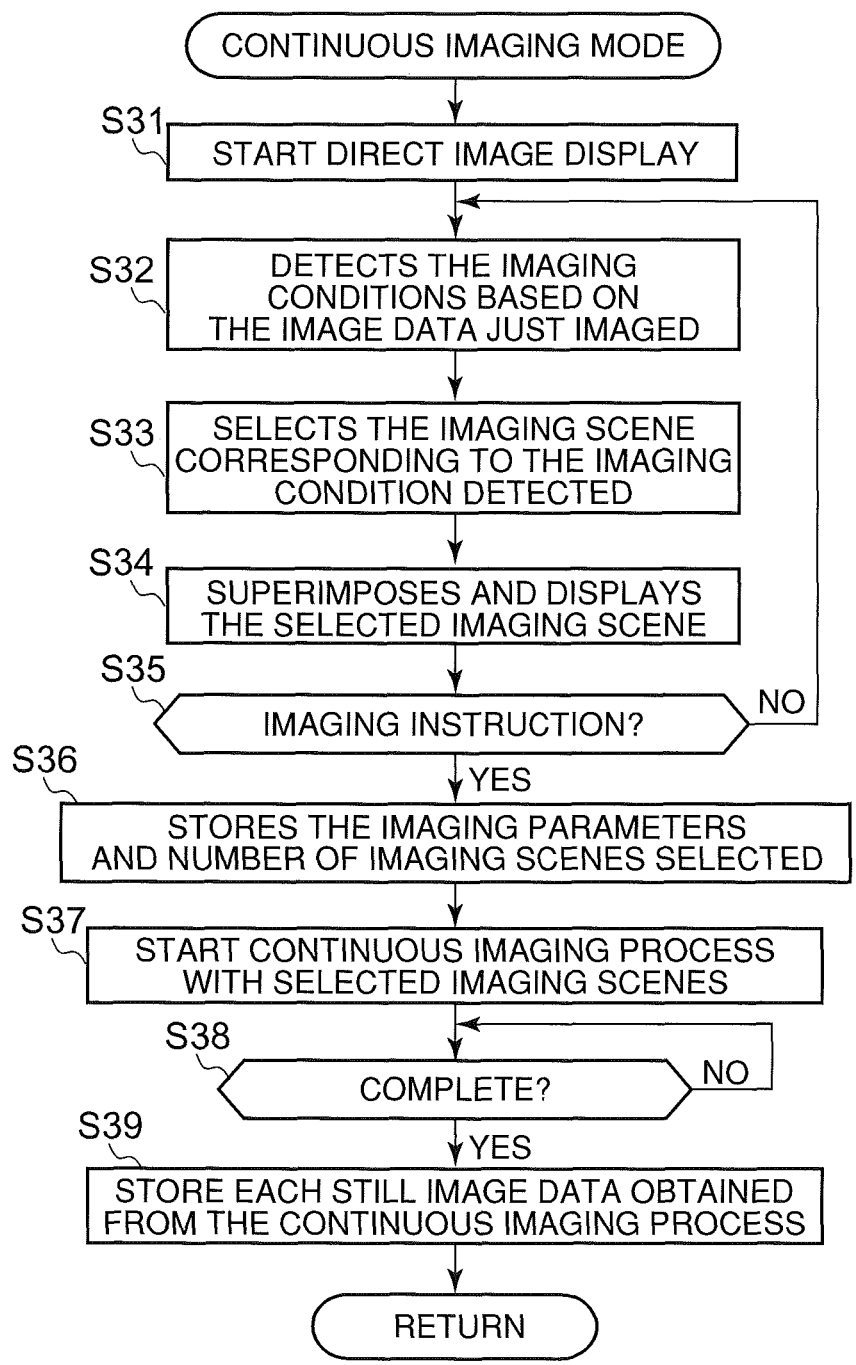
FIG. 5 is a flowchart illustrating a third embodiment of the operation of a digital camera in accordance with the invention.

The operation of the digital camera 1 in the third embodiment will be explained below following the flowchart in FIG. 5. When the continuous imaging mode is set by the user operating the mode switching key of the key input unit 10, the CPU 9 starts a process that images the subject using the CCD 4 and displays a direct image of the subject that has been imaged (Step S31). Next, the CPU 9 detects the imaging conditions based on the image data that has just been imaged (Step S32) (detection section). The brightness of the subject is detected based on the luminance component of the image data that has been imaged by the CCD 4, the color tone of the subject is detected based on the respective R, G, and B color components of the image data, and the motion vector is calculated based on the image data.

Next, the CPU 9 selects automatically imaging scenes that are close to the imaging conditions that have been detected (Step S33) (the automatic selection section). These selected imaging scenes are stored in the buffer memory. If imaging scenes have already been stored, they will be overwritten. More specifically, the CPU 9 selects automatically multiple imaging scenes based on the results of determining the imaging conditions such as the degree of brightness, the color tone, the state of the motion vector, and the like, detected in Step S32, and determining the degree of similarity with the imaging parameter data for each imaging scene.

The memory 11 is provided in advance with a table that stores, using similarity categorization, the imaging scenes (imaging scene numbers) corresponding to the various conditions (imaging conditions) such as the degree of brightness, color tone, and state of motion vector, etc. Thus, in this table, imaging scenes are stored corresponding to various imaging conditions, such as imaging scenes corresponding to degrees of brightness, imaging scenes corresponding to color tones, and imaging scenes corresponding to the state of motion vectors. For example, the imaging scenes of "Nightscape," "Fireworks," and the like, are stored corresponding to "Brightness is dark"; the imaging scenes "Sunset" and "Fall foliage," and the like are stored corresponding to "Color tone is red"; and the imaging scenes "Sports," "Splashing water," and "Blur reduction," and the like, are stored corresponding to the fast and large-movement states of the motion vectors.

The CPU 9 automatically selects multiple imaging scenes based on the degrees of similarity after determining the degrees of similarity of the imaging scenes using the imaging conditions detected in Step S32 (the current brightness, color tone, motion vectors, etc.) and these groups. As a method of determining the imaging scenes with these degrees of similarity, there is the method of adding one point for the similarity point score for each place the imaging scene corresponds with each individual imaging parameter detected in Step S32, with higher degrees of similarity for those imaging scenes with more similarity points. Additionally, a specific number of imaging scenes may be selected automatically, starting with those with the highest number of similarity points that have been determined as described above, or a plurality of imaging scenes having at least a predetermined number of similarity points may be selected automatically, or all imaging scenes to which points have been added may be selected automatically.

For example, if the numbers of the imaging scenes corresponding to the degree of brightness detected in Step S32 were 2, 5, 7, 10, and 20, then one similarity point would be added to each of the imaging scenes with those numbers. Additionally, if the numbers of the imaging scenes corresponding to the color tone detected in Step S32 were 5, 6, 10, 13, and 19, then one similarity point would be added to each of the imaging scenes with those numbers. Additionally, if the numbers of the imaging scenes corresponding to the motion vectors detected in Step S32 were 3, 5, 7, and 12, then one similarity point would be added to each of the imaging scenes with those numbers. In this manner, similarity points are added to imaging scenes corresponding to the various imaging conditions, and the greater the number of similarity points that have been added to an imaging scene, the greater the degree the similarity is determined to be.

Alternatively, the imaging scenes may be selected automatically based on the degrees of similarity by calculating the degrees of similarity through calculations, without the provision of a table. Moreover, a plurality of imaging scenes may be selected based on the results of determination of the degrees of similarity between automatically selected imaging parameters and the individual imaging scenes of those parameter data after determining imaging parameters through directly determining imaging parameters automatically (the imaging parameter setting section) as has been done conventionally based on the detected imaging conditions (or based on image data that had been imaged immediately previously). Thus, a plurality of imaging scenes with imaging parameters that are similar to or resembling imaging parameters that are determined automatically may be selected automatically.

Next, the CPU 9 reads out the titles, explanations, and sample images of all of the selected imaging scenes from the appended information data in the memory 11, based on the imaging scene numbers that have been stored, and compresses and displays the imaging scenes that have been read out (compressing the images as shown in FIG. 3C), and displays these superimposed on the direct image display (Step S34). At this time, the imaging scene may be displayed as a semi-transparency. Rather than displaying the titles, explanations, and sample images of the imaging scenes as shown in FIG. 3C, the titles may be displayed superimposed on the direct image display alone.

The CPU 9 then determines whether there has been an instruction from the user to perform imaging (Step S35). If it is determined that there has not been an imaging instruction (S35: NO), then the CPU 9 returns the processing to Step S33. As a result, the imaging scenes that are selected automatically also change (and the imaging scene numbers that are stored also change) in response to changes in the imaging conditions, and the imaging scenes that are displayed change accordingly as well.

On the other hand, if it is determined that an imaging instruction has been performed (S35: YES), then the CPU 9 reads out, from the imaging parameter data in the memory 11, the imaging parameters corresponding to the numbers of each of the imaging scenes currently stored (currently selected), and stores these parameters in the imaging parameter storage area of the buffer memory, and also stores the number of imaging scenes that have been selected (Step S36) (the setting section). Thus, the imaging parameters of the selected plurality of imaging scenes are set as the imaging parameters for each imaging in the continuous imaging. The number of stored imaging scenes corresponds, without modification, to the number of images to be imaged through continuous imaging. When the imaging parameters of the imaging scenes are stored, the storage is performed through associating imaging scene numbers and imaging parameters.

The CPU 9 then starts the continuous imaging process based on the number of images (image count) to shoot and on the imaging parameters for each image (imaging) that were stored (Step S37). Specifically, a process is started so as to perform a continuous imaging process under the imaging parameters of each of the imaging scenes sequentially, starting with the imaging scene with the lowest number such that, of the imaging scene numbers (imaging scene numbers) associated with each of the imaging parameters stored in the imaging parameter storage area, the still imaging process is performed under the imaging parameters for the smallest imaging scene number, followed by the still imaging process performed under the imaging parameters for the next smallest imaging scene number, and so forth. Thus, the respective still imaging processes are performed using the imaging parameters of the plurality of automatically selected imaging scenes. Alternatively, the continuous imaging process may be performed starting with the largest imaging scene number or the continuous imaging process may be performed by selecting the imaging scene numbers at random.

The CPU 9 then determines whether the continuous imaging process has been completed (Step S38). If it is determined that the continuous imaging process has not been completed (S38: NO), then the CPU 9 repeats the process in Step S38 until the continuous imaging process has been completed. When it is determined that the continuous imaging process has been completed (S38: YES), then the CPU 9 stores, into the flash memory 13, the plurality of the still image data obtained by the continuous imaging process (Step S39), to complete the processing in the continuous imaging mode. At this time, the imaging scene information indicating the imaging scene under which the imaging was performed (for example, the imaging scene name or the imaging scene number, etc.) is stored in association with each of the image data that is stored.

As described above, in the third embodiment, the imaging conditions are detected from image data that is imaged, and a plurality of imaging scenes that match the detected imaging conditions is selected automatically, eliminating the work by the user of selecting the imaging scenes and inputting the imaging parameters. Moreover, even in cases where the imaging must be done in a hurry, such as when there is a photo opportunity, a plurality of imaging scenes thought to be suitable to the current imaging conditions is selected by the user, and a continuous imaging process is performed based on the plurality of imaging scenes that has been selected, not only enabling the user to select with ease a plurality of desired candidate images without missing the photo opportunity, but also enabling the user to select the image that is actually desired.

While in the first, second and third embodiments described above, the static image data imaged by the continuous imaging process were stored in the flash memory 13, alternatively, all of the static image data obtained by the continuous imaging process may be displayed on the image display unit 14, with only the static image data selected by the user stored in the flash memory 13.

Moreover, while in the first embodiment, the user input the number of images to shoot and the imaging parameters for each, or in other words, the number of sets of imaging parameters input was equal to the input number of images to shoot, instead the number of sets of imaging parameters may be different from the input number of images to shoot. For example, while in the first embodiment, the number of sets of imaging parameters was equal to the number of images to be shot, such as imaging parameters A for the first image, imaging parameters B for the second image, imaging parameters C for the third image, and imaging parameters D for the fourth image, instead, with 4 input as the number of images to shoot, two sets of imaging parameters, A and B, may be input. In this case, the imaging may proceed such that the first image is imaged under imaging parameters A, the second image is imaged under imaging parameters B, the third image is imaged under imaging parameters A, and the fourth image is imaged under imaging parameters B, or the first and second images may be imaged under imaging parameters A with the third and fourth images are imaged under imaging parameters B. Similarly, the still imaging may be performed continuously with different imaging parameters. The number of sets of imaging parameters must be no more than the number of images to shoot.

Moreover, while in the second and third embodiments, the number of images to shoot is determined based on the number of imaging scenes selected, alternatively, continuous imaging may be performed for a number of images greater than the number of imaging scenes selected. For example, in the second and third embodiments, if imaging scene A, imaging scene B, imaging scene C, and imaging scene D have been selected, a total of four images were imaged continuously, with an image imaged under the imaging parameters of imaging scene A, an image imaged under the imaging parameters of imaging scene B, an image imaged under the imaging parameters of imaging scene C, and an image imaged under the imaging parameters of imaging scene D. Similarly, the number of images to shoot may be larger than the number of selected imaging scenes, such as having the number of images to be continuously imaged be 4, with the selected imaging scenes being imaging scene A and imaging scene B. In this case, the imaging proceeds such that the first image is imaged under the imaging parameters of imaging scene A, the second image is imaged under the imaging parameters of imaging scene B, the third image is imaged under the imaging parameters of imaging scene A, and the fourth image is imaged under the imaging parameters of imaging scene B, or the first and second images may be imaged under the imaging parameters of imaging scene A with the third and fourth images are imaged under the imaging parameters of imaging scene B. Generally, all that is needed is to have still images imaged continuously with differing imaging parameters, and it is not necessary for each set of imaging parameters for each still image that is imaged continuously to be different.

Moreover, while in the first and second embodiments, different imaging parameters were input or different imaging scenes were selected, alternatively, perfectly identical imaging parameters may be input or identical imaging scenes may be selected. For example, in the first embodiment, imaging parameters may be input for the second image that are identical to the imaging parameters for imaging in the first image. Moreover, in the second embodiment identical imaging scenes may be selected a plurality of times. Generally, all that is needed is to have still images imaged continuously with differing imaging parameters, and it is not necessary for each set of imaging parameters for each still image that is imaged continuously to be different.

Moreover, in the second and third embodiments, along with displaying the still image data, when displaying each of the still image data recorded in the continuous imaging, the imaging scene information (the title and number of the imaging scene) recorded in association with each still image data may be displayed as well. This enables the user to know which imaging scene imaging parameters were used when imaging the still image data, enabling appropriate learning of the imaging scenes for different imaging conditions for future imaging.

Moreover, as in the first embodiment, the various imaging parameters imaged in the continuous imaging process may be stored as a single group in the second and third embodiments as well. Thus, when a group is selected, all of the imaging parameters belonging to that group are read out, and the continuous imaging is performed using each of the imaging parameters that are read out.

Moreover, in the third embodiment, the user may select the most desirable still image data of all of the still image data imaged in the continuous imaging, and the CPU may record this, in association with the imaging conditions at the time of the continuous imaging, and the imaging scene used. This enables the digital camera 1 to learn. Moreover, when, in the normal still imaging mode, it is determined that the imaging conditions are the same as the imaging conditions that were recorded, the imaging scene recorded in association with the recorded imaging conditions may be displayed as the optimal imaging scene, and the settings may be set to the imaging parameters of that imaging scene automatically. When this continuous imaging is performed, these imaging conditions may be the degree of brightness, color tone, motion vectors, and the like, detected based on the image data imaged prior to performing the continuous imaging process, and, as is conventional, the imaging parameters may be determined automatically through automatic determination of the imaging parameters directly based on that image data. Moreover, in the direct image display in the normal still imaging mode, when it is determined that the imaging parameters that are determined automatically, determined through automatic determination of each imaging parameter directly based on image data that has been imaged or on the degree of brightness, color tone, motion vectors, etc., detected based on the image data, are essentially the same as the imaging parameters or the degree of brightness, color tone, motion vectors, etc., recorded as imaging conditions, then the imaging scene that is recorded in association with those imaging conditions is displayed, and the imaging parameters of that imaging scene are set automatically.

Fourth Embodiment

In a fourth embodiment of the invention, the user may select the process of the first, second or third embodiments, or may select imaging in a single shot, and the digital camera may execute the selected process. The digital camera in the fourth embodiment has a structure identical to that of the first embodiment. However, in the digital camera 1 as set forth in the fourth embodiment, there is a recording mode for the basic imaging and a playback mode for playing back recorded images, as the operating modes thereof, and also a best-shot mode, described below, as a subsidiary mode to the recording mode, and the mode setting keys are used to set these modes. The best-shot mode is a mode that sets automatically, as imaging parameters when imaging, the shutter speed, iris value, color balance, and the like, for the selected scene after a selection by a user, through sample images that are samples of imaging results, of a scene that is identical to an imaging scene that includes the imaging environment at that time and the subject that is to be imaged, or a scene with a desired environment.

Figure 6:
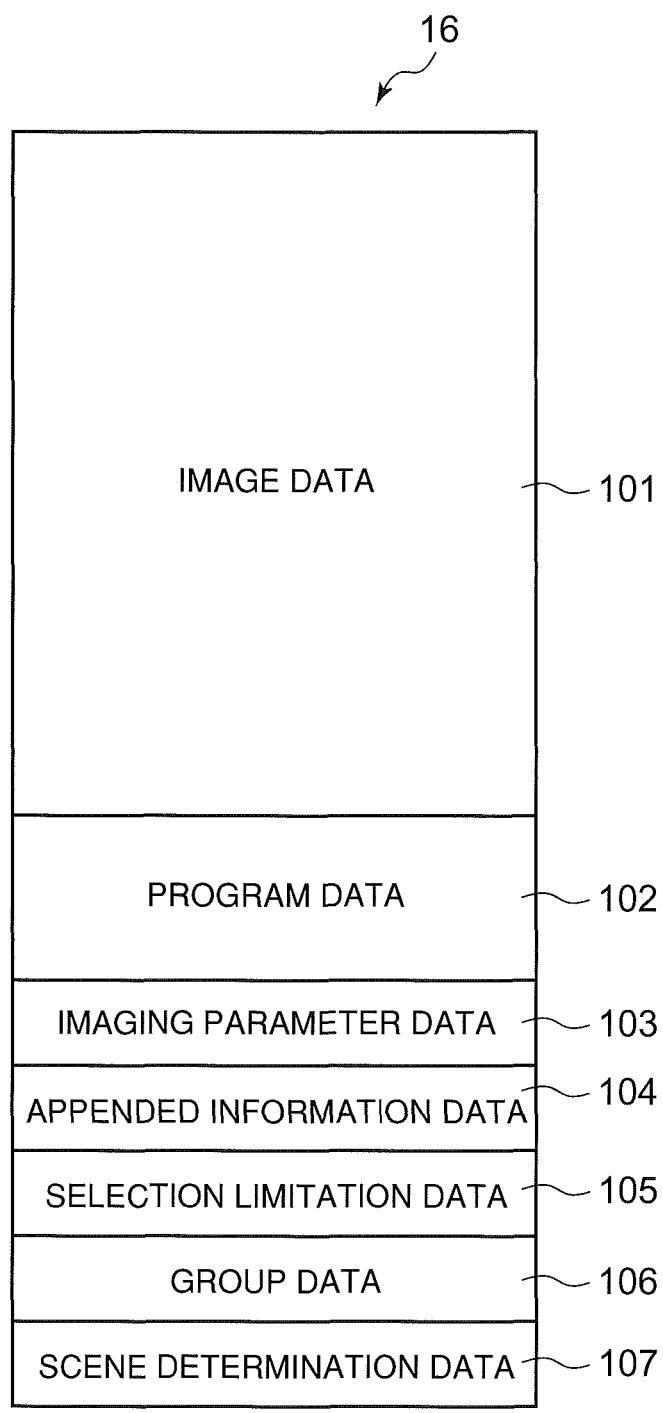
FIG. 6 is a conceptual diagram illustrating stored data in internal memory.

Moreover, as shown in FIG. 6, if there is inadequate free space in the flash memory 13, for example, the image data 101 that is stored temporarily, the program data 102, the imaging parameter data 103, the appended information data 104, the selection limitation data 105, the group data 106, and the scene determination data 107 are stored in the memory 11.

This program data 102 is a firmware that includes the various types of control programs required for controlling the various parts of the CPU 9 and for data processing, and program AE data that structures program line drawings indicating commendations of iris values (F) and shutter speeds corresponding to the correct exposure values (EV's) at the time of imaging.

Moreover, the imaging parameter data 103, the appended information data 104, the selection limitation data 105, the group data 106, and the scene determination data 107 are used when imaging in the aforementioned best-shot mode, and each is data such as described below.

As shown in FIG. 3A, the imaging parameter data 103 includes recorded photographing parameters including the values of shutter speed, iris, EV shift and color emphasis, etc. for each scene number.

Further, as shown in FIG. 3B, as the appended information data 104, a title, indicating for example "photographing people", which is the description of the scene, a note for explanation of imaging scene saying "sets the color emphasis to skin tone and causes an attractive defocusing of the background on the distant side" and sample image data are recorded separately for each scene number.

FIG. 7 is a conceptual diagram illustrating the content of selection limitation data. The selection limitation data 105 is data that indicates a combination of imaging scenes wherein the imaging parameters are mutually contradictory, and in the example in FIG. 7, these are combinations of imaging scenes wherein there are mutually contradictory imaging parameters of "Portrait imaging scene" and "Landscape imaging scene," marked with an "X" in the position of the intersection. Specifically, the "Sports" (scene number 8) or "Stops water when splashing" (scene number 14), which set the shutter speed to fast as one of the imaging parameters, combined with "Smoothes the flow of water" (scene number 13) which sets the shutter speed to slow as one of the imaging parameters, are such a combination. The selection limitation data 105 is used when "Manual" is selected as the selection method for the imaging scenes when the use of the continuous shooting function is selected in the best-shot mode, described below.

FIG. 8 is a conceptual diagram illustrating the content of the group data 106. The group data 106 is data indicating groups (in the figure, "A" through "D," or the like) belonging to the individual imaging scenes described above, wherein, in the present embodiment, those imaging scenes that are likely to be selected together when imaging the same subject in the best-shot mode are grouped in advance. The group data 106 is used when "Group" is selected as the selection method for the imaging scenes when the use of the continuous shooting function is selected in the best-shot mode, described below.

FIG. 9 is a conceptual diagram illustrating the content of scene determination data 107. The scene determination data 107 is structured from determination data, bridging a plurality of different determination items that are determined in advance depending on the respective imaging scenes described above. As shown in FIG. 9, the determination data 107 are subject information that can be obtained based on image data, such as brightness, subject hue, type of light source, subject movement, the existence of a face, and the like. Moreover, the determination data 107 are values indicating the characteristics of the individual imaging scenes, and although not shown, these are set, for example, as ranges of brightness for "Brightness," reddish or bluish for "Hue," sunlight, fluorescent light, or cloudy sky for "Type of light source," the amount of motion for "Motion of subject," and Yes or No for "Presence of a face". The scene determination data 107 is used when "Auto" is selected as the selection method for the imaging scenes when the use of the continuous shooting function is selected in the best-shot mode, described below.

Figure 10:
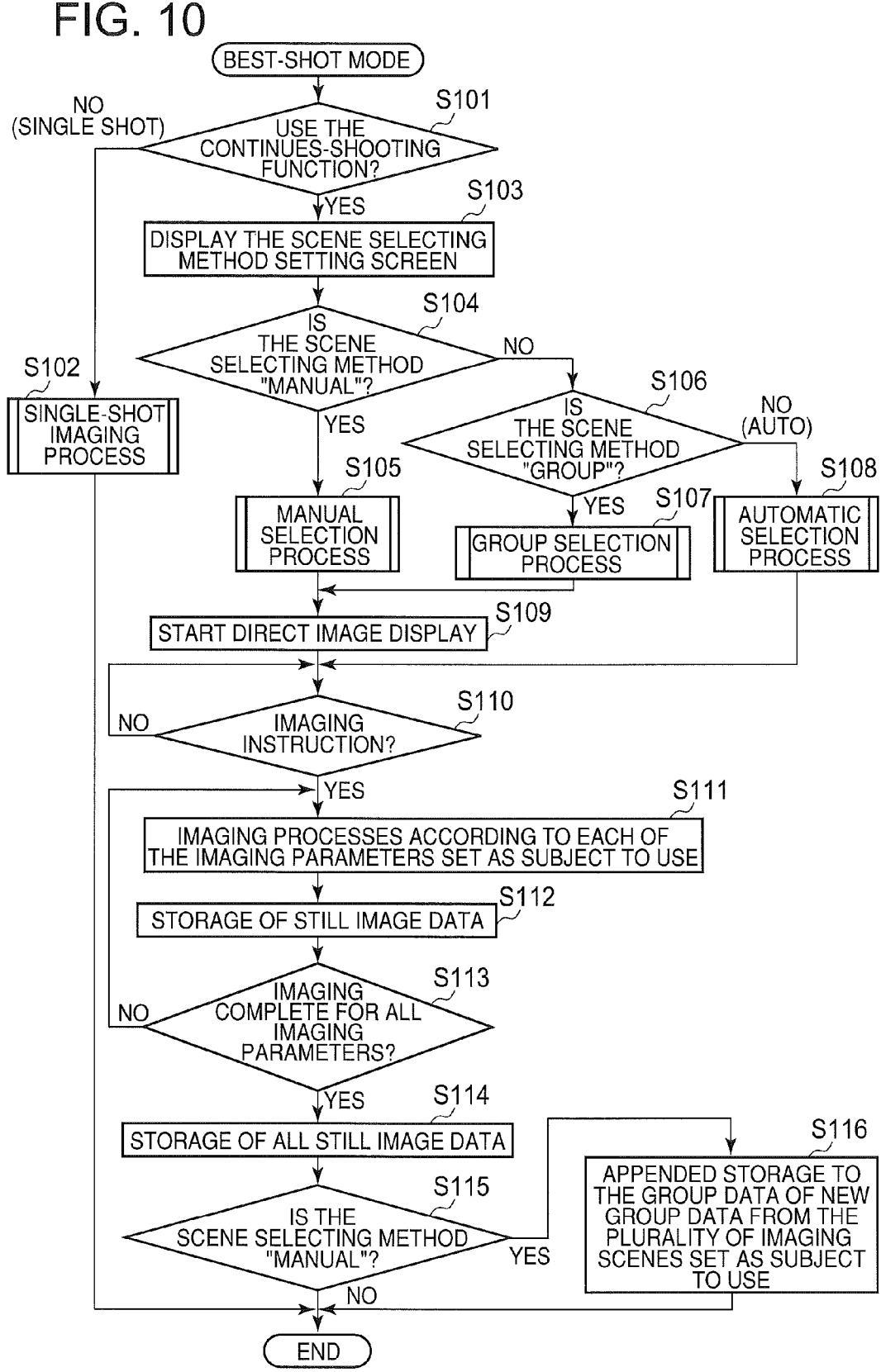
FIG. 10 is a flowchart illustrating a fourth embodiment of the operation, in best-shot mode, of a digital camera in accordance with the invention.

FIG. 10 is a flowchart illustrating the operation of the fourth embodiment of the digital camera 1 in accordance with the invention when the best-shot mode, described above, is set for the recording mode. When the best-shot mode has been set, the user is allowed to select whether to use the continuous shooting function that performs continuous imaging a plurality of times in response to a single image instruction and stores a plurality of still images, whereby if the continuous shooting function is used, the user is allowed to specify the method for selecting the imaging scene.

When the best-shot mode is set by the user, the CPU 9 of the digital camera 1 determines whether the use of the continuous shooting function has been selected (Step S101). If it is determined that the use of the continuous shooting function has not been selected (Step S101: NO), then the CPU 9 performs a single-shot imaging process (Step S102).

Figure 11:
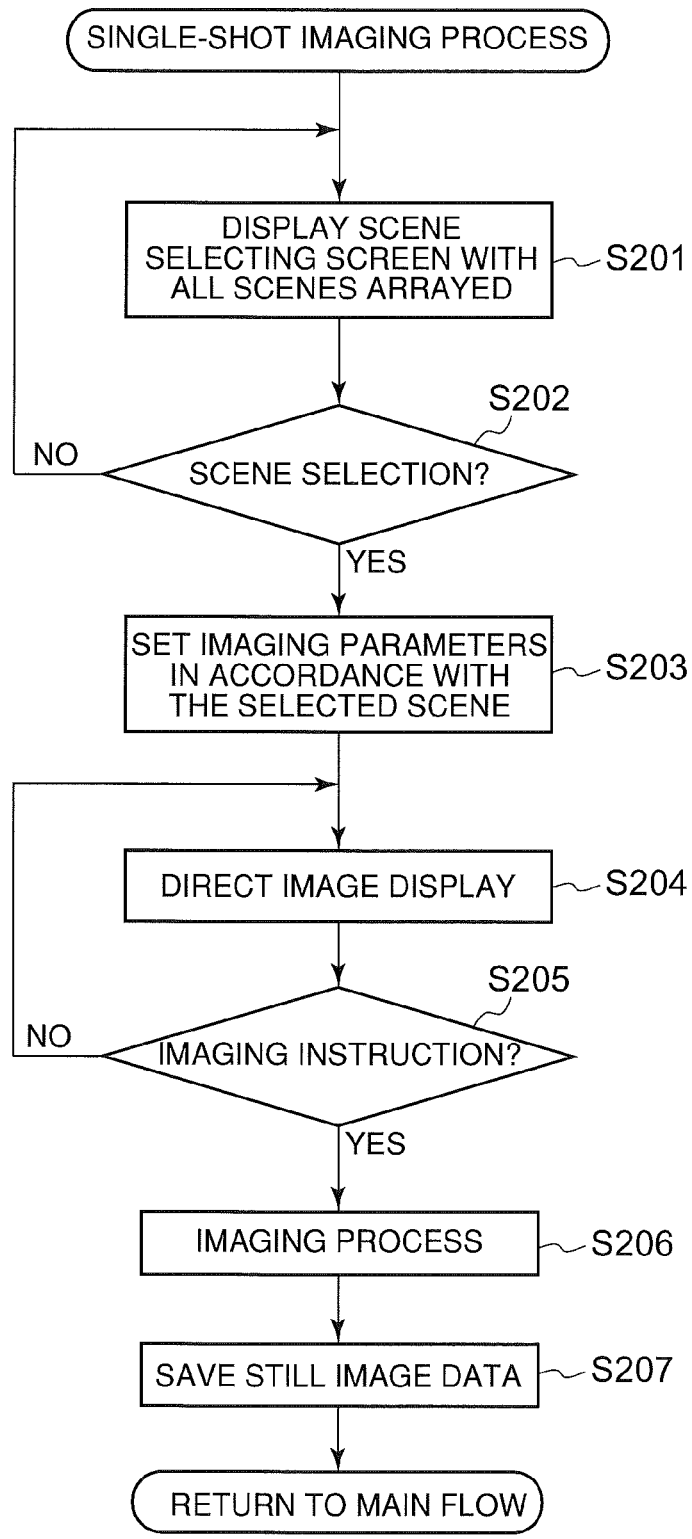
FIG. 11 is an explanatory diagram illustrating a single-shot imaging process in the best-shot mode.
Figure 15:
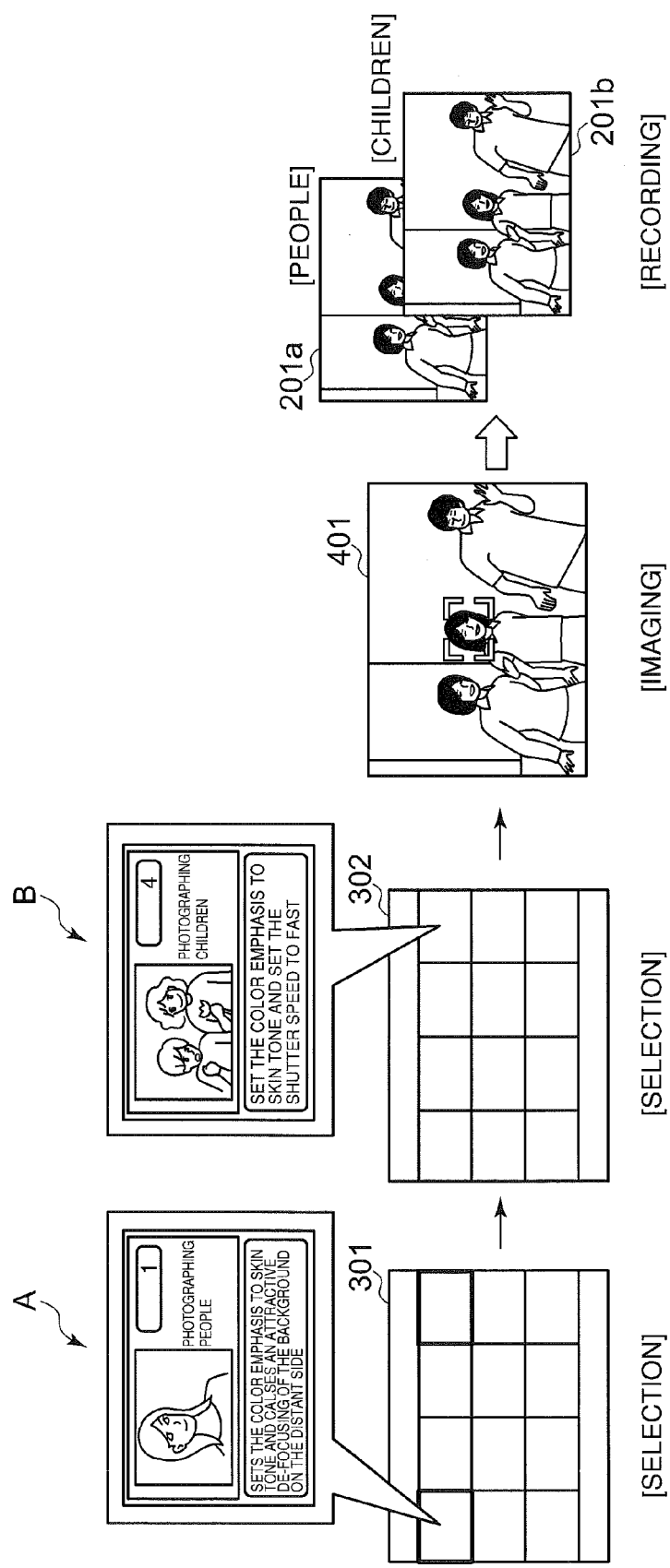
FIG. 15 is an explanatory diagram illustrating the details of operation when the manual selection process is performed.

FIG. 11 is a flowchart for explaining the single-shot imaging process. First, the CPU 9 displays a scene selecting screen (for example, a scene selecting screen such as shown in FIG. 15) that displays a table of sample images showing all of the imaging scenes that have been registered in advance and stored in the memory 11 as appended information data 104, as shown in FIG. 3B (Step S201). Next, the CPU 9 determines whether the desired imaging scene has been selected by the user through the key input unit 10 (Step S202). The imaging scene selection is performed by a selection cursor movement operation through operating a + key, and a confirmation operation by operating the SET key. Additionally, the selection of the imaging scene may be performed by merely displaying imaging scene A or B, as shown in FIG. 15, and having an imaging scene display switching operation by operating the + key, and a confirmation operation by operating the SET key.

Additionally, when it is determined that one of the imaging scenes has been selected (S202: YES), the CPU 9 reads out data in response to the selected imaging scene (scene number) from the imaging parameter data 103, as shown in FIG. 3A (reading out a plurality of imaging parameter set values), and sets these automatically as the imaging parameters for performing imaging (Step S203).

The CPU 9 then starts the direct image display, switches to the imaging standby screen (Step S204), and determines whether there has been an imaging instruction through the operation of the shutter key (Step S205). If it is determined that there has not been an imaging instruction (S205: NO), then the CPU 9 returns the processing to Step S204. If it is determined that there has been an imaging instruction (S205: YES), then the CPU 9 performs the imaging process in accordance with the imaging parameters that have been set in advance, or in other words, performs the imaging process, including controlling the shutter speed, iris value, color balance, and the like, in response to the imaging scene that has been selected by the user (Step S206). Next, the CPU 9 compresses the image data that has been obtained, and stores the compressed image data in the flash memory 13 as a still image file.

Thereafter, processing returns to the main flow illustrated in FIG. 10, and one cycle of the imaging operation is completed by the best-shot mode without further processing. As a result, the user is able to obtain an image with the intended ambience by merely selecting the desired imaging scene prior to imaging, without having to perform any complicated operations for setting imaging parameters, and without having to think about combinations of set values thereof.

On the other hand, if the use of the continuous shooting function is selected in the flowchart illustrated in FIG. 10 (S102: YES), then the CPU 9 displays, on the image display unit 14, a setting screen that allows the user to select the method for selecting the imaging scene (Step S103). In the present embodiment, three different methods for selecting the imaging scene (hereinafter termed "scene selecting methods") are provided: "Manual," "Group," and "Auto." When it is determined that "Manual" has been selected (S104: YES), then processing switches to the manual selecting process (Step S105). Moreover, if "Group" has been selected (S104: NO and S106: YES), then processing switches to the group selecting process (Step S107). Moreover, when it is determined that "Auto" has been selected (S104: NO and S106: NO), then processing switches to the automatic selecting process (Step S108).

Figure 12:
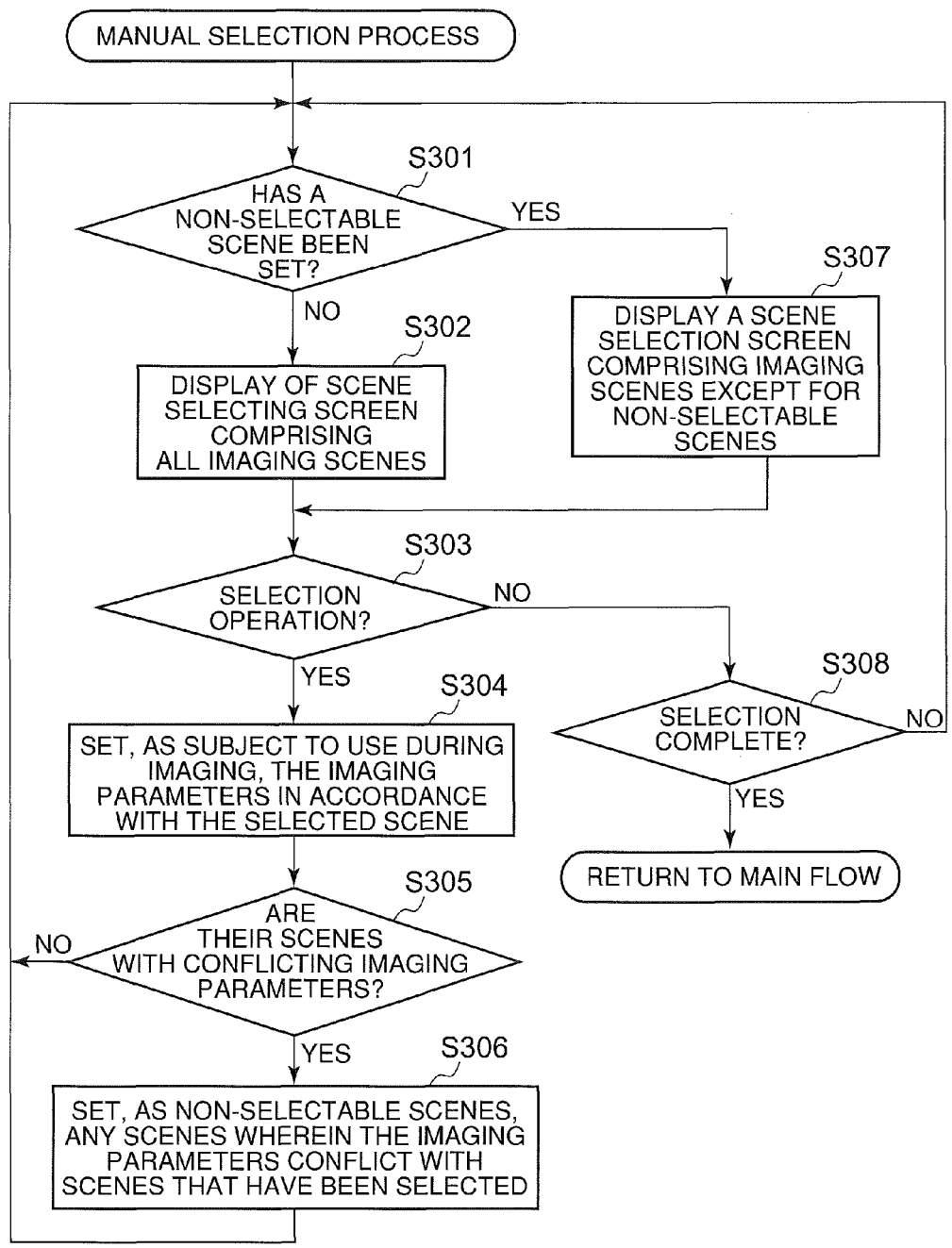
FIG. 12 is a flow chart illustrating the manual selection process when the use of the continuous shooting function is selected in the best-shot mode.

The case wherein "Manual" is selected as the scene selecting method will be explained first. FIG. 12 is a flowchart for explaining the manual selecting process.

When switching to the manual selecting process, the CPU 9 determines whether there is a setting for a non-selectable scene (Step S301). "Non-selectable scene" is described below. At the beginning of the operation, no non-selectable scene has been set (S301: NO), so the CPU 9 displays, on the image display unit 14, the scene selecting screen wherein all of the imaging scenes (sample images) that have been stored are arrayed, the same as in the case described above for the single-shot imaging process (Step S302). The user selects the desired imaging scene. As in the embodiment described above for the single-shot imaging process, the selection of the imaging scene may be performed by merely displaying imaging scene A or B, as shown in FIG. 15, and having an imaging scene display switching operation by operating the + key, and a confirmation operation by operating the SET key. Next, the CPU 9 determines whether one of the imaging scenes has been selected by the user through the key input unit 10 (Step S303).

If it is determined that one of the imaging scenes has been selected (S303: YES), then the CPU 9 stores the scene number of the selected imaging scene, and sets, as the imaging parameters to be used at the time of imaging, the imaging parameters corresponding to that imaging scene (Step S304).

Thereafter, the CPU 9 references the selection limitation data 105, as shown in FIG. 8, to determine whether there exists an imaging scene wherein the imaging parameters contradict those of the imaging scene that has been selected. If it is determined that there is no imaging scene wherein the imaging parameters contradict those of the imaging scene that has been selected (S305: NO), then the CPU 9 returns the processing to Step S301. In this case, the determination result in Step S301 is again NO, so like the case wherein in the process first started, a scene selecting screen that comprises all of the imaging scenes is displayed again (Step S302). Those imaging scenes that have already been selected are displayed in a state that cannot be discriminated from the other imaging scenes.

On the other hand, if it is determined that there is an imaging scene wherein the imaging parameters contradict those of the imaging scene that has been selected (S305: YES), then the CPU 9 sets that imaging scene to be an imaging scene that cannot be selected (a non-selectable imaging scene) (Step S306), and returns the processing to Step S301. In this case, the determination result in Step S301 is YES, so the CPU 9 displays, on the image display unit 14, a scene selecting screen comprising all of the imaging scenes except for the non-selectable scenes (Step S307). The user selects the desired imaging scene from the scene selecting screen that excludes the non-selectable scenes. In other words, when selecting the second imaging scene or beyond, the imaging scenes that can be selected are constrained depending on the imaging scenes that have already been selected.

Thereafter, the user is allowed to select a plurality of imaging scenes by repeating the operations described above. The non-selectable scenes can be made known to the user by displaying a scene selecting screen wherein those imaging scenes that are non-selectable scenes are displayed in gray when selecting the second imaging scene and subsequent imaging scene, and by prohibiting the motion of the imaging scene selecting cursor.

Moreover, if the imaging scene selection completion has been indicated by a predetermined key operation by the user (S303: NO, S308: YES), then the CPU 9 ends the manual selecting process and returns processing to the main flow in FIG. 10.

Thereafter, the CPU 9 starts the direct image display on the image display unit 14 (Step S109), and, in the imaging standby mode, determines whether there has been an imaging instruction through the operation of the shutter key (Step S110). If it is determined that there is no imaging instruction (S110: NO), then the CPU 9 repeats the process in Step S110 until there is an imaging instruction. If it is determined that there has been an imaging instruction (S110: YES), then the CPU 9 reads out the imaging parameters that are set to be used at that time (where the scene number corresponds to the stored imaging scene), performs the imaging process in accordance therewith (Step S111), and then stores the still image data obtained through imaging into the DRAM 12 (Step S112).

The CPU 9 then determines whether the imaging process has been completed in accordance with the imaging parameters a number of times that depends on the number of sets of imaging parameters that have been set (the number of imaging scenes that have been specified) (Step S113). If it is determined imaging processes have not been completed in accordance with all of the imaging parameters (S113: NO), then the CPU 9 returns the processing to Step S111. If it is determined that imaging processes have been completed in accordance with all of the imaging parameters (S113: YES), then the CPU 9 stores, as respective still image files in the flash memory 13, the plurality of still image data that are stored in the DRAM 12 (Step S114). More specifically, the operations in Step S21 and S22 are repeated until the imaging processes in accordance with all of the imaging parameters (scene numbers) specified as subject to use have been completed. Thus, continuous imaging is performed with different imaging parameters for the same subject. Thereafter, once the imaging processes have been completed a number of times depending on the number of sets of imaging parameters that have been set (the number of imaging scenes that have been specified), the CPU 9 records, as respective still image files in the flash memory 13, the plurality of still image data stored in the DRAM 12.

Next, the CPU 9 determines whether or not "Manual" was selected as the scene selecting method (Step S115). If it is determined that "Manual" was selected as the scene selecting method (S115: YES), then the CPU 9 adds a recording of a new group, including the plurality of imaging scenes selected this time as subject for use in continuous imaging, to the group data 106, as shown in FIG. 8 (Step S116), and completes a single imaging operation in the best-shot mode. If it is determined that "Manual" has not been selected as the scene selecting method (S115: NO), then the CPU 9 completes a single imaging operation in the best shot mode.

FIG. 15 is an explanatory diagram illustrating the details of operations when "Manual" has been selected as the scene selecting method, as described above. If, for example, imaging has been performed after selecting two imaging scenes A and B, "People" and "Children," an image 201a, reflecting the imaging parameters corresponding to "People," and an image 201b, reflecting the imaging parameters corresponding to "Children" can be obtained in a single imaging operation. In FIG. 15, reference numeral 301 designates a scene selecting screen comprising all imaging scenes, reference numeral 302 designates a scene selecting screen comprising imaging scenes excluding the non-selectable scenes, and reference numeral 401 designates a direct image.

As described above, when "Manual" has been selected as the scene selecting method, it is possible to obtain, in a single imaging operation, the same images as the images obtained when the use of the aforementioned continuous shooting function has not been selected in best-shot mode, or in other words, by performing the normal still imaging process multiple times using the same imaging scene in best-shot mode that performs the single-shot imaging process in FIG. 15.

As a result, it is possible to obtain with ease, multiple images with varying image qualities, different from images wherein, for example, only the brightness, or the like, has been changed in a stepwise or incremental manner (images wherein the image quality has been changed monotonically) obtained through conventional autobracketing imaging, as images from multiple selections of imaging scenes in advance of the imaging operation.

However, by constraining or preventing the selection of imaging scenes wherein the imaging parameters contradict those of previously selected imaging scenes when selecting the second imaging scene or subsequent imaging scenes, it is possible to avoid selections of imaging scenes that are completely different from the type of subject or imaging environment, while respecting the intentions of the user for multiple imaging scenes. As a result, it is possible to preclude the combination of some images with other images that reflect imaging parameters that are extremely different within the plurality of images that are ultimately obtained, thus making it possible to suppress, to some degree, the scope of variance of image quality between the respective images.

It is not absolutely necessary to impose constraints on the non-selectable imaging scenes in the second cycle and subsequent cycles. Furthermore, the number of imaging scenes that can be selected prior to the imaging operation may be limited to a predetermined number.

Figure 13:
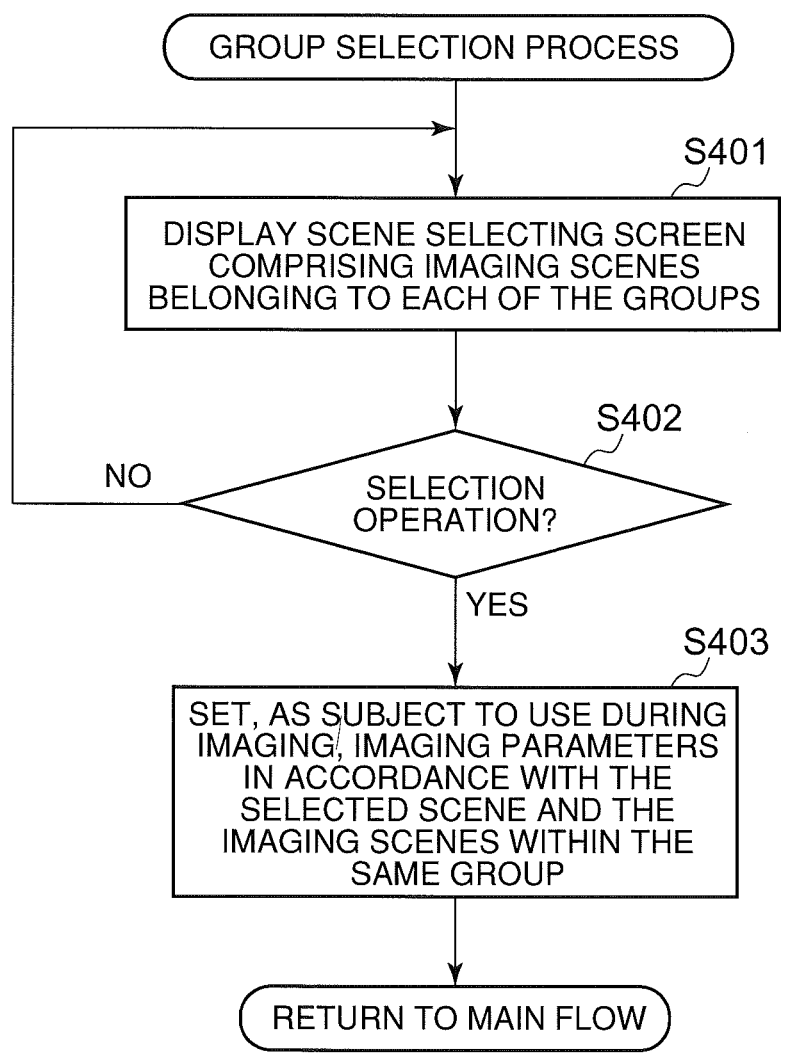
FIG. 13 is a flow chart illustrating the group selection process when the use of the continuous shooting function is selected in the best-shot mode.

The procedure wherein "Group" is selected as the scene selecting method in Step S106 of FIG. 10 (S106: YES) will be explained with reference to. FIG. 13 which is a flowchart for explaining the group selecting process.

When switching to the group selecting process, the CPU 9 displays the scene selecting screen, including imaging scenes belonging to at least one group, based on the group data 106 as shown in FIG. 8. The user is able to select the desired imaging scene from the scene selecting screen. Next, the CPU 9 determines whether one of the imaging scenes has been selected by the user through the key input unit 10 (Step S402). If it is determined that an imaging scene has not been selected (S402: NO), then the CPU 9 returns the processing to Step S401. If it is determined that one of the imaging scenes has been selected (S402: YES), then the CPU 9 stores the scene numbers of the selected imaging scene and of imaging scenes within the same group thereof, to thereby set, as the imaging parameters to be used at the time of imaging, the imaging parameters corresponding to those imaging scenes (Step S403). The group selecting process is thereby finished, and processing returns to the main flow in FIG. 10.

Thereafter, the CPU 9 performs continuous imaging while varying the imaging parameters for the single subject, through the processes in Step S109 through Step S114, described above. If it is determined that "Group" has been selected as the scene selecting method (S115: NO), then the CPU 9 skips the process in Step S116 and completes a single imaging operation in the best-shot mode without further processing.

Figure 16:
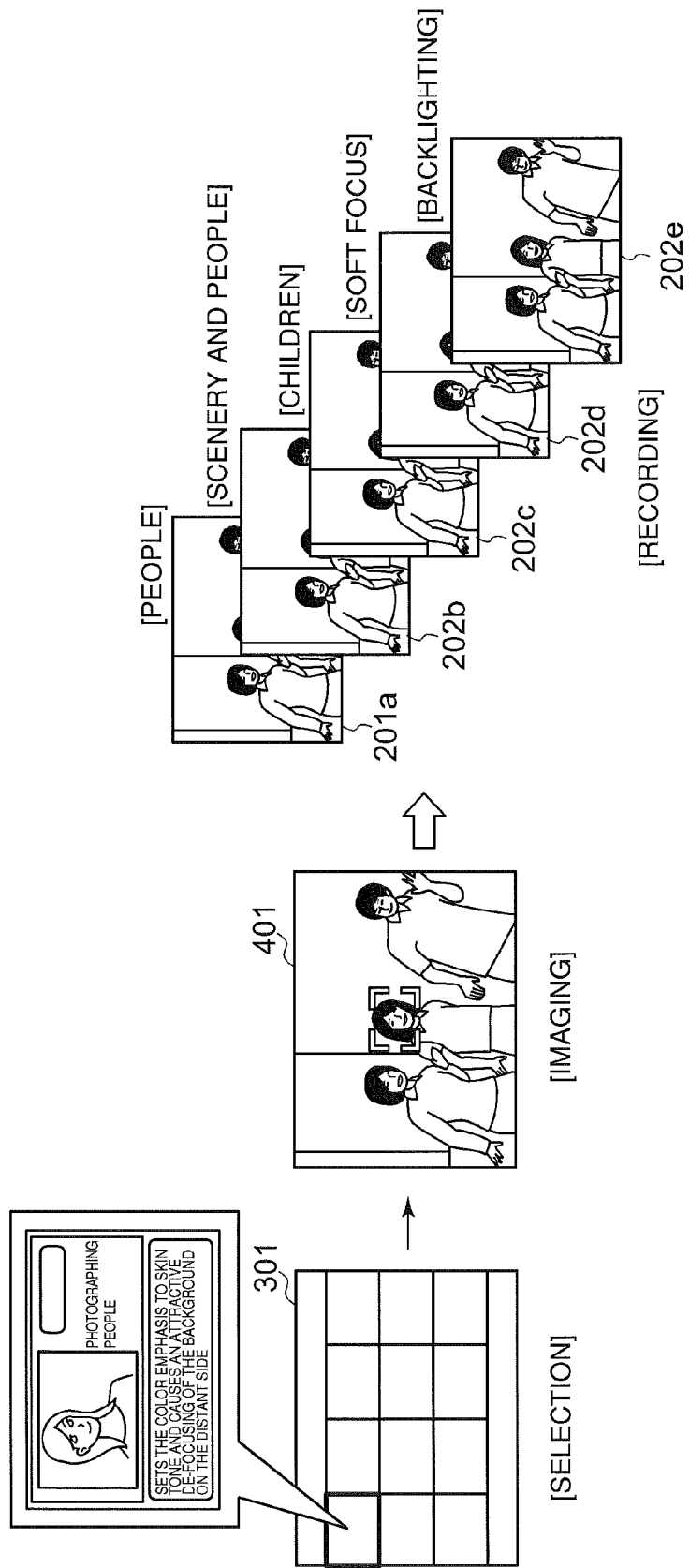
FIG. 16 is an explanatory diagram illustrating the details of operation when the group selection process is performed.

FIG. 16 is an explanatory diagram illustrating the details of the operations when "Group" has been selected as the scene selecting method, as described above, and when performing imaging with, for example, "People" selected as the imaging scene. With these settings, it is possible to obtain images 201a-201e, reflecting respective imaging parameters corresponding to multiple imaging scenes belonging to the same group A as "People," in this case "Scenery and people," "Children," "Soft focus," and "Backlighting," all in a single imaging operation. In FIG. 16, reference numeral 301 designates a scene selecting screen including all imaging scenes, and reference numeral 401 designates a direct image.

As described above, when "Group" has been selected as the scene selecting method, it is possible to obtain, in a single imaging operation, the same images as the images obtained by performing the normal still imaging process multiple times in the best-shot mode that performs the single-shot imaging of FIG. 11, as when "Manual" was selected as the scene selecting method, by selecting an imaging scene prior to the imaging operation.

In contrast to only obtaining images varying only brightness, for example, in a stepwise manner in conventional autobracketing imaging, in the autobracketing imaging in the present embodiment, it is possible to easily obtain multiple images with image qualities varying in diverse ways.

Furthermore, since the imaging parameters that are applied at the time of continuous imaging are imaging parameters corresponding to a predetermined imaging scene belonging to the same group as the imaging scene selected by the user, it becomes possible to limit the number of continuous imaging cycles, or in other words, the number of images recorded in a single operation.

Additionally, since in the present embodiment, those imaging scenes that are likely to be selected together are grouped together in advance when imaging the same subject in the best-shot mode, it is possible to perform imaging without performing the manual selection operations for the imaging scenes multiple times, which is not the case when "Manual" is selected for the scene selecting method. As a result, this is particularly convenient when the scene that should be selected is not known in advance of continuous imaging, i.e., in a case wherein a manual selection could be made when selecting about one scene, but it would be inconvenient to perform manual selections of multiple scenes.

When grouping the imaging scenes, the grouping method may be based on the type of subject, such as "People," "Water," "Nightscapes," or "Nature." In this case, if the imaging scenes that are registered in advance are the scenes shown in FIG. 8, or the like, then imaging scenes such as "People," "People and scenery," and "Children," may be put into the "People" group; imaging scenes such as "Smoothes the flow of water" and "Stops water when splashing," may be put into the "Water" group; imaging scenes such as "Nightscape" and "High sensitivity" may be put into the "Nightscapes" group; and imaging scenes such as "Scenery," "Scenery and people,"

"Makes greens look natural," and "Fall Foliage" may be put into the "Nature" group. Moreover, grouping may also be done by other types of imaging environments, such as by the location of imaging ("Outdoors" versus "Indoors"), by the timing of the imaging ("Spring," "Summer," "Autumn," or "Winter"), or by the time of imaging ("Morning," "Afternoon," or "Evening"). Furthermore, in any case, a given imaging scene may be placed in a plurality of groups.

Figure 14:
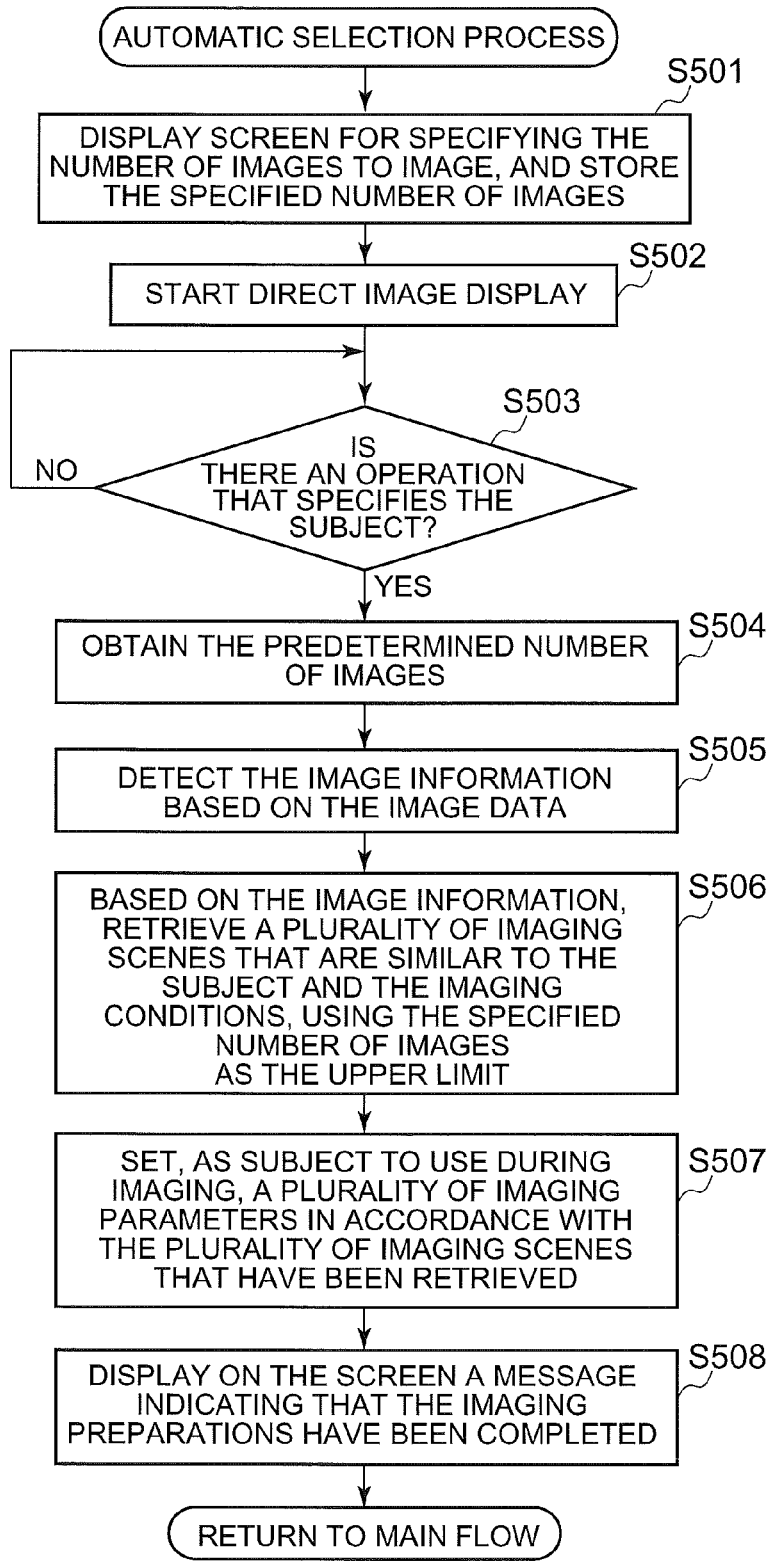
FIG. 14 is a flow chart illustrating the automatic selection process when the use of the continuous shooting function is selected in the best-shot mode.

The procedure wherein "Auto" is selected as the scene selecting method in Step S106 of FIG. 10 (S106: NO) will be explained with reference to FIG. 14 which is a flowchart for explaining the automatic selecting process.

When switching to the automatic selecting process, the CPU 9 first displays, on the image display unit 14, a screen for specifying the number of images to be imaged, and then stores the number of images to be imaged, specified by the user key operations based on this display screen (Step S501). The CPU 9 then starts the direct image display (Step S502). The user is able to specify the subject that will be subjected to continuous imaging. Specification of the subject may be performed, for example, by depressing the shutter key half-way, if the structure is one wherein a shutter key half-depression operation is possible.

Next, the CPU 9 determines whether there has been an operation by the user to specify the subject that will be subjected to the continuous imaging (Step S503). If it is determined that there has not been an operation by the user to specify the subject that will be subjected to the continuous imaging (S503: NO), then the CPU 9 repeats the process in Step S503 until there is this specification operation. If it is determined that there has been an operation by the user to specify the subject that will be subjected to the continuous imaging (S503: YES), then the CPU 9 takes a predetermined number of images (Step S504), and detects predetermined image information based on the image data from the number of images obtained (Step S505). The CPU 9 detects the brightness of the subject based on the luminance component of the image data, detects the hue of the subject based on the R, G, and B color components of the image data, detects the motion vector of the subject (the amount of movement of the subject) by comparing the contents between image data, and detects whether there is a face part, by performing face recognition.

The CPU 9 then sets the specified number of images, specified by the user in Step S501, as the upper limit, and searches for a plurality of imaging scenes, from the plurality of imaging scenes that have been registered, that are close to the content of the subject or close to the current imaging conditions, based on individual subject information detected as described above. In other words, the CPU 9 searches for a plurality of scenes that are similar to the actual imaging scene (Step S506).

The CPU 9 uses the scene determination data 107, as shown in FIG. 9, to compare, for each determination item for each of the imaging scenes, the determination data and the imaging data that has already been detected, and it defines as candidates those imaging scenes wherein there is at least one matching determination item, and then applies a rank ordering with the number of matching determination items as the degree of similarity. At this time, the priority sequence is applied for those imaging scenes having the same number of matching determination items starting with those imaging scenes with the higher total number of points after calculating by totaling numbers of points that reflect the priority relationships between the determination items, which are numbers of points, determined in advance, for each of the matching determination items. Moreover, the priority sequence may be applied for multiple imaging scenes having the same total number of points starting with the ones with the lowest scene numbers. Thereafter, a number of imaging scenes depending on the aforementioned number of images specified are obtained beginning with those with highest priority sequence (highest degree of similarity) applied above, of those imaging scenes having one or more matching determination items.

Next, the CPU 9 stores the scene numbers of the plurality of imaging parameters corresponding to the plurality of imaging scenes obtained (retrieved) as described above, to set, as the imaging parameters to be used when imaging, the imaging parameters corresponding to those imaging scenes. After this, the CPU 9 displays, on the screen, a message informing the user that the imaging preparations have been completed (Step S508), ends the automatic selecting process, and returns the processing to the main flow in FIG. 10.

After ending the automatic selecting process, the CPU 9 switches the processing to Step S110, and awaits the imaging instruction. Thereafter, the CPU 9 performs continuous imaging while varying the imaging parameters for the single subject, through the processes in Step S111 through Step S113, described above, to complete one cycle of the imaging operation using the best-shot mode.

Consequently, when "Auto" has been selected as the scene selecting method, it is possible to obtain, in a single imaging operation, the same images as the images obtained by performing the normal still imaging process multiple times in the best-shot mode that performs the single-shot imaging of FIG. 11, as when "Manual" or "Group" was selected as the scene selecting method, by specifying a subject prior to the imaging operation.

Additionally, in contrast to only obtaining images varying only brightness, for example, in a stepwise manner in conventional autobracketing imaging, in the autobracketing imaging in the present embodiment, it is possible to easily obtain multiple images with image qualities varying in diverse ways.

Furthermore, imaging parameters corresponding to imaging scenes similar to the actual imaging scene are set automatically as the imaging parameters to be applied to the continuous imaging by merely specifying a subject, and thus, in contrast to the case when "Manual" or "Group" was selected as the scene selecting method, there is no need for operations for selecting, prior to the continuous imaging, a scene that is similar to the actual imaging scene. As a result, this is particularly convenient when the user has no idea about which scene to select prior to the continuous imaging, or is having a difficult time deciding.

Moreover, in the present embodiment, the user has specified in advance, through key operations, the number of images desired, making it possible to limit the number of images that are imaged continuously, or in other words, the number of images recorded at one time, in the same manner as when "Group" was selected for the scene selecting method.

While in Step S505, described above, image information such as the brightness of the subject, the hue, the amount of motion (the motion vectors), and the presence/absence of a face is detected (obtained), as the scene specifying information in the present invention, from the image data of the subject specified by the user, and in Step S506 a plurality of imaging scenes that are similar to the actual imaging scene is retrieved based on the image data that has been obtained, the following may be performed instead.

For example, in Step S505, external data, such as the imaging date and time and the imaging timing, which cannot be obtained from the image data, may be obtained separately from this image data, and in Step S506, a plurality of imaging scenes that are similar to the actual imaging scene may be retrieved based on the external data and/or the image data described above. However, in this case, it is necessary to prepare scene determination data including determination items pertaining to the image data and determination items pertaining to the external data, as the determination items, which is different from the scene determination data 107 as shown in FIG. 9.

Moreover, while in Step S503, described above, it was determined whether there had been an operation specifying the subject, rather than an operation for specifying the subject, the processes in Steps S504-Step S507 may be executed repeatedly while the direct image is displayed.

Moreover, in Step S505, described above, the image data may be detected using only the image data within an area specified as desired by the user, or within a predetermined area (for example, the AF area) that is determined in advance, within the image data, when detecting the predetermined image data based on a plurality of frames of image data. In this case, when the AF area is placed on the subject and the shutter key is depressed half-way, the predetermined image data is detected based on the image data within the AF area, thus enabling detection of the image data of the desired subject.

The embodiment described above enables a user to easily obtain, when the use of the continuous shooting function in the best-shot mode is selected, a plurality of images, wherein the image qualities are changed in a diversity of ways, through the effective use of various types of imaging modes prepared for single-shot imaging, different from the images wherein only the brightness, for example, has been changed in a stepwise manner, obtained through the conventional autobracketing imaging. As a result, it is possible to significantly enhance the ease of use when performing bracketing imaging.

Moreover, when "Manual" is selected as the scene selecting method, then, as described above, a new group, including a plurality of imaging scenes corresponding to each of the imaging parameters specified as imaging parameters suitable for continuous imaging, can be added and saved to the group data 106, as shown in FIG. 8. Consequently, by merely selecting "Group" as the scene selecting method thereafter and then selecting a single desired scene, it is possible to set automatically, as the imaging parameters to be applied during continuous imaging, each of the sets of imaging parameters corresponding to the plurality of imaging scenes (imaging modes) selected manually before. The respective effects due to the other scene selecting methods are as outlined above.

In contrast to the present embodiment, a new group of a plurality of imaging scenes corresponding to each of the imaging parameters specified as imaging parameters suitable for continuous imaging may be recorded, even when "Automatic" is selected as the scene selecting method, as when "Manual" is selected.

Fifth Embodiment

In as fifth embodiment of a digital camera 1 in accordance with the invention, the digital camera may combine a plurality of existing imaging parameters to produce new imaging parameters, the user may select one or more of the existing imaging parameters and new imaging parameters, and the digital camera may perform imaging based on the selected imaging parameters. As in fourth embodiment, the present embodiment relates to a digital camera structured so that the user can select whether or not to use a continuous shooting function when imaging in the best-shot mode. The structure is identical to that shown in FIG. 1, and the imaging parameter data 103 and appended information data 104 are stored in the memory 11. Furthermore, a program is stored in the memory 11 to cause the CPU 9 to function as the first imaging control section, the second imaging control section, the selection control section, the generation section, and the imaging recording control section in the present invention.

Figure 17:
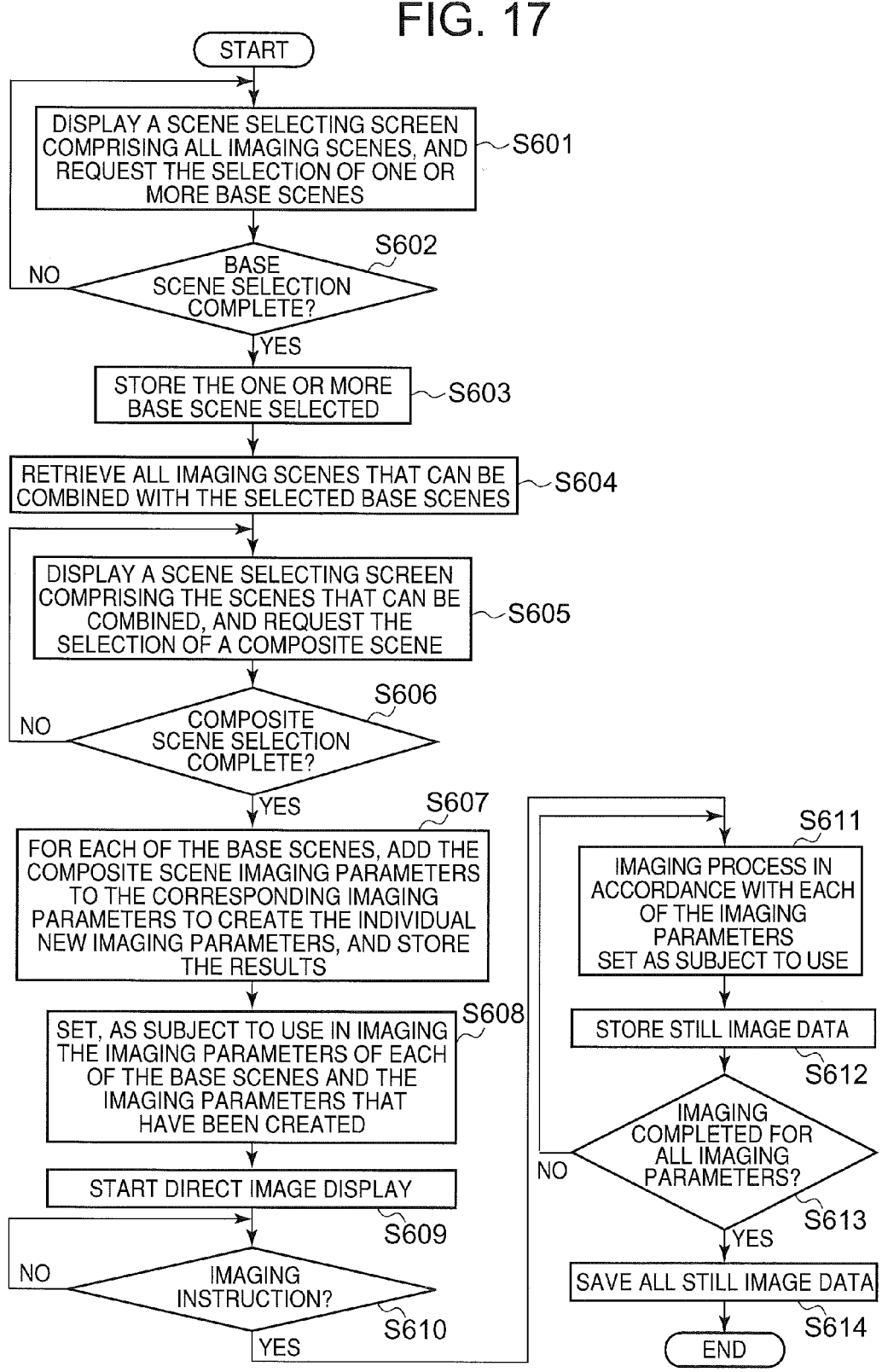
FIG. 17 is a flow chart illustrating an alternative operation of a digital camera in accordance with the invention when the use of the continuous shooting function is selected in the best-shot mode.

FIG. 17 is a flow chart illustrating the operation when the use of the continuous shooting function is selected in the best-shot mode in the digital camera in the present embodiment.

When the use of the continuous shooting function is selected, the CPU 9 of the digital camera 1 displays a scene selecting screen, including all of the imaging modes, and receives from the user, a selection of one or more imaging scenes as the base scenes (Step S601). The CPU 9 then determines whether one or more base scenes have been selected (Step S602). If it is determined that a base scene has not been selected (S602: NO), then the CPU 9 returns the processing to Step S601. If it is determined that one or more base scenes has been selected (S602 YES), then the CPU 9 stores the selected base scenes in the DRAM 12 (Step S603), and retrieves imaging scenes that can be combined with all of the selected one or more base scenes (Step S604).

Of the imaging scenes that have been stored, those imaging scenes that have imaging parameters that correspond to all of the one or more base imaging scenes, and having corresponding imaging parameters with details that do not overlap each other, will be retrieved. Thus, when, in the imaging parameters corresponding to the base scene, specific imaging parameter items such as the shutter speed are stipulated, those imaging scenes wherein, in the corresponding imaging parameters, the identical imaging parameter item is not specified, or in other words, imaging scenes that have different critical points in the imaging parameters, are retrieved.

Next, the CPU 9 displays a scene selecting screen including only those scenes that were retrieved and that can be combined, and receives the desired imaging scene selection, from the user, as a composite scene to be composited or joined with the one or more base scenes. The CPU 9 then determines whether a composite scene has been selected by the user (Step S606). If it is determined that a composite scene has not been selected (S606: NO), then the CPU 9 returns the processing to Step S605. If it has been determined that a composite scene has been selected (S606:YES), then the CPU 9 generates new imaging parameters wherein the imaging parameters of the composite scene are added by compositing with each of the corresponding imaging parameters for each of the base scenes individually, wherein the new imaging parameters that are generated are stored in the DRAM 12 (Step S607). For example, if, as shown in FIG. 18, "Smoothes the flow of water" and "Stops water when splashing" are selected as the base scenes and "People" is selected as the composite scene, then two different sets of imaging parameters, corresponding to virtual imaging scenes that have not actually been stored, those being "Smoothes the flow of water+People" and "Stops water when splashing+People," are generated as new sets of imaging parameters.

The CPU 9 then sets the imaging parameters corresponding to the one or more base scenes and the newly generated imaging parameters as being subject to use at the respective times of imaging (Step S608). In the example described above, a total of four sets of imaging parameters, i.e., the two sets of imaging parameters that correspond to the two base scenes and the two sets of imaging parameters that were newly created, are set as being subject to use at the time of imaging. At this time, scene numbers are stored for the imaging parameters corresponding to the base scenes.

Thereafter, the CPU 9 starts the direct image display on the image display unit 14 (Step S609), switches to the imaging standby mode, and determines whether there has been an imaging instruction through the operation of the shutter key (Step S610). If it is determined that there is no imaging instruction (S610: NO), then the CPU 9 repeats the process in Step S610 until there is an imaging instruction. If it is determined that there has been an imaging instruction (S610: YES), then the CPU 9 reads out the imaging parameters that are set to be used at that time, performs the imaging process in accordance therewith (Step S611), and then stores the still image data obtained through imaging into the DRAM 12 (Step S612).

The CPU 9 then determines whether imaging processes have been completed according to every one of the sets of imaging parameters that were set as subject to use (Step S613). If it is determined imaging processes have not been completed in accordance with all of the imaging parameters that have been set as subject to use (S613: NO), then the CPU 9 returns the processing to Step S611. Thus, the operations in Step S611 and S612 are repeated until the imaging processes in accordance with all of the imaging parameters set as subject to use have been completed. Continuous imaging is performed with different imaging parameters for the same subject. If it is determined that imaging processes have been completed a number of times according to the number of sets of imaging parameters that have been set (S613: YES), then the CPU 9 stores, as respective still image files in the flash memory 13, the plurality of still image data that are stored in the DRAM 12, which are the individual still image data obtained by the imaging processes at the mutually differing imaging parameters (Step S614). This ends one imaging operation in the best-shot mode.

With the camera as set forth in the present embodiment, as described above, when the use of the continuous shooting function in the best-shot mode is selected, continuous imaging is performed using each of a total of at least three different sets of imaging parameters, those being the combination of imaging parameters corresponding to the base scene and composite scene that were selected directly, and the new set of imaging parameters generated from the single combination of those imaging parameters. This is achieved by the user merely selecting two different imaging scenes, as the base scene and the composite scene, prior to the imaging operation.

As a result, it is possible to easily obtain a plurality of images wherein image qualities are varied in diverse ways, through the effective use of various imaging modes that are prepared for single-shot imaging, through autobracketing imaging as set forth in the presence embodiment. Additionally, it is possible to easily obtain a plurality of images that include images that apply new imaging parameters, which cannot be obtained through performing normal still imaging multiple times when simply changing the selected scenes without using the continuous shooting function in the best-shot mode, as opposed to obtaining images wherein, for example, only the brightness is varied in a stepwise manner, through conventional autobracketing imaging. Thus, it is possible to significantly enhance the ease of use when performing bracketing imaging.

While in the present embodiment, imaging was performed through the application of imaging parameters corresponding to the respective base scenes and composite scene that were selected directly by the user when performing continuous imaging in the best-shot mode, alternatively, imaging may be performed by applying the new imaging parameters alone when at least two imaging scenes are selected as base scenes. For example, in the case of the example shown in FIG. 8, imaging may be performed by applying only the two new sets of imaging parameters corresponding to the virtual imaging scenes of "Smoothes the flow of water+People" and "Stops water when splashing+People."

Moreover, while in the present embodiment, it was explained that the new imaging parameters that are applied during continuous imaging are generated by selecting a plurality of imaging scenes by the user, divided into two different types, those being base scenes and composite scenes, and then compositing the imaging parameters on the composite scene side onto the imaging parameters on the base scene side, alternatively, the user may select three or more imaging scenes and new imaging parameters (for example: A+B+C) that composite all of the three or more sets of imaging parameters (for example A, B, and C) corresponding to the selected scenes may be generated as the new imaging parameters to be applied during continuous imaging.

Even in this configuration, it is still possible to obtain a plurality of images through continuous imaging by changing the image quality in diverse ways. Moreover, even when performing continuous imaging in this case, imaging may be performed by applying imaging parameters corresponding to imaging scenes selected directly by the user as in the present embodiment, and imaging may be performed by applying the newly generated parameters alone.

Sixth Embodiment

In a sixth embodiment of a digital camera 1 in accordance with the invention, the digital camera may be arranged such that, by the user merely selecting an imaging scene, bracketing imaging is performed by varying, in a stepwise manner, the set values for imaging parameters that are applied to the imaging scene. As in the fourth embodiment, the present embodiment relates to a digital camera structured so that the user can select whether or not to use a continuous shooting function when imaging in the best-shot mode. Furthermore, although the structure is identical to that shown in FIG. 1, a program is stored in the memory 11 to cause the CPU 9 to function as the first imaging control section, the selection control section, the change section, the third imaging control section, and the imaging recording control section in the present invention. Furthermore, instead of the selection limitation data 105, group data 106, and scene determination data 107, bracketing data 108 having the content shown in FIG. 19 can be stored in the memory 11.

The bracketing data 108 is data corresponding to the respective imaging scenes stored in the digital camera, and includes the imaging parameters wherein the set values vary in a stepwise manner during continuous imaging in the best-shot mode (termed "adjustment parameters"), adjustment increments (adjustment amounts) that are the amounts of change in each cycle of each of the parameters that are adjusted during continuous imaging, and the number of adjustments.

The adjustment parameters are determined in advance depending on the details of the corresponding imaging scenes, or in other words, the imaging parameters, and are specific imaging parameters for which the settings are not automatic nor standard in the imaging parameter data 103, as shown in FIG. 6. The specific set values for the adjustment increments are adjustment steps, such as one step or two steps, if the values that can be set are stepwise, such as when the imaging parameter is the shutter speed or the iris, or the adjustment strength for, for example, image processing such as color emphasis, sharpness, edge enhancement, or color filtering. The number of adjustments is the number of times that the adjustment parameters are changed by the adjustment increments, which is a plural number of times in the present embodiment.

As in the fourth embodiment, the digital camera of the present embodiment is also structured so that the user can select whether or not to use a continuous shooting function when imaging in the best-shot mode.

Figure 20:
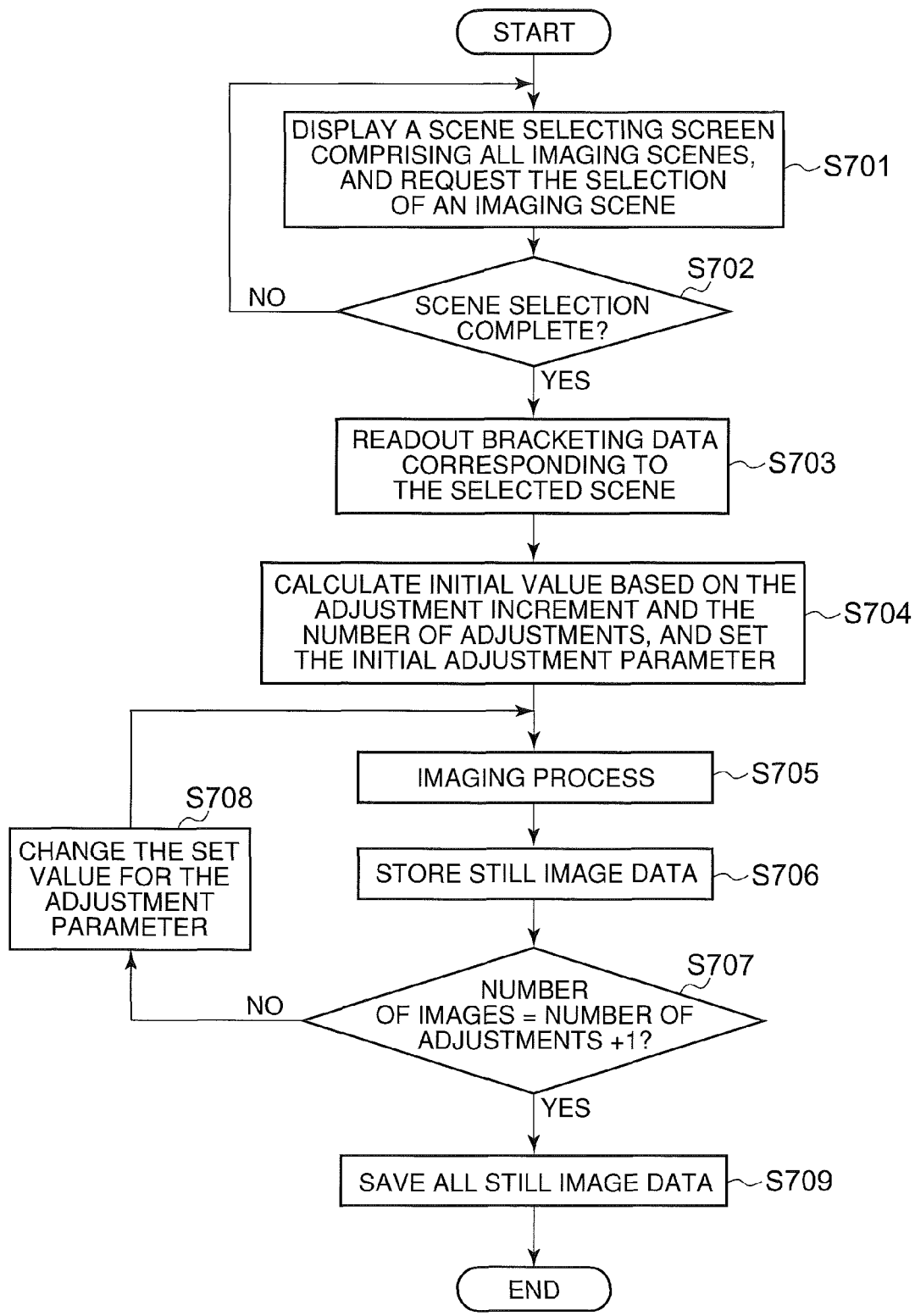
FIG. 20 is a flow chart illustrating an alternative operation of a digital camera in accordance with the invention when the use of the continuous shooting function is selected in the best-shot mode.

FIG. 20 is a flow chart illustrating the operation of the digital camera when the use of the continuous shooting function is selected in the best-shot mode in the sixth embodiment.

When the use of the continuous shooting function is selected, the CPU 9 of the digital camera 1 displays a scene selecting screen, including all of the imaging modes, and receives from the user, a selection of the desired imaging scenes as the base scenes (Step S701). The CPU 9 then determines whether an imaging scene has been selected by the user (Step S702). If it is determined that an imaging scene has not been selected by the user (S702: NO), then the CPU 9 returns the processing to Step S701. If it is determined that one of the imaging scenes has been selected by the user (S702: YES), then the CPU 9 first reads out the bracketing data 108 corresponding to the selected imaging scene (Step S703), calculates the initial value of the adjustment parameter based on the adjustment amount and number of times the adjustment is to be performed, and then sets the initial value for the adjustment parameter (Step S704). The initial value for the adjustment parameter is a value such that the central value, when the adjustment parameter is changed by the adjustment amount for the number of times that the adjustment is to be performed, will be the set value that would be set automatically for the adjustment parameter under AE control, AWB control, or the like.

Next, the CPU 9 performs the imaging process according to the imaging parameters that include the adjustment parameter (Step S705), and stores the still image data obtained through imaging into the DRAM 12 (Step S706). The CPU 9 determines whether the number of imaging cycles is a specific number of cycles that is one greater than the number of adjustments to be performed for the adjustment parameter (Step S707). If it is determined that the number of imaging cycles is not a specific number of cycles that is one greater than the number of adjustment cycles to be performed on the adjustment parameter (Step S707: NO), then the CPU 9 updates set value for the adjustment parameter to a value that is changed by an amount equal to the adjustment increment, described above (Step S708), and the processing returns to Step S705. Thus, the operations in Step S705 and S706 are repeated, after updating the set value for the adjustment parameter to a value changed by the adjustment increment, described above, until the number of imaging cycles is a specific number of cycles that is one greater than the number of adjustments cycles for the adjustment parameter. Continuous imaging is performed with different imaging parameters for the same subject.

For example, if the imaging scene that is selected by the user prior to imaging is "Sports" or "Smoothes the flow of water," then continuous imaging is performed as the shutter speed is varied in a stepwise manner, and if the imaging scene is "Flowers," then continuous imaging is performed as the color saturation is varied in a stepwise manner. Moreover, when the imaging scene is "People," then if the skin tone color emphasis is varied in a stepwise manner during continuous imaging while, similarly, for "Makes greens look natural," the green color emphasis is varied in a stepwise manner, and for "Fall foliage," it is the red color emphasis that is varied in a stepwise manner.

Thereafter, if it is determined that the number of imaging cycles is a specific number that is one greater than the number of adjustments cycles for the adjustment parameter (S707: YES), then the CPU 9 stores, as respective still image files in the flash memory 13, the plurality of still image data that are stored in the DRAM 12, which are the individual still image data obtained by the imaging processes at the mutually differing imaging parameters (Step S709). This ends one imaging operation in the best-shot mode.

As described above, in the digital camera as set forth in the present embodiment, when the use of the continuous shooting function is selected in the best-shot mode, it is possible to perform bracketing imaging by varying, in a stepwise or incremental manner, the set value for an imaging parameter that is applied to an imaging scene at that time by merely selecting the subject to be imaged and selecting an imaging scene that is the same as an imaging scene that includes the imaging environment at the time, or selecting a scene with an ambience as desired, the same as in single-shot imaging, prior to the imaging operation.

Moreover, since it is possible to perform bracketing imaging by selecting an imaging scene (imaging mode) that is provided for single-shot imaging, it is not necessary to prepare imaging modes for continuous shooting (bracketing imaging) separate from those for the imaging mode for single-shot imaging. This enables use of the same imaging modes for both single-shot and continuous shooting.

Consequently, regardless of whether a user is knowledgeable regarding cameras and photography or not, the user will be able to utilize the autobracketing function effectively, which can significantly improve the ease-of-use when performing bracketing imaging.

While in the fourth, fifth and sixth embodiments described above, there was an explanation of application of the present invention to a digital camera that is provided with a best-shot mode that displays a title, an explanation, and a sample image for each imaging mode, as a screen for selecting the imaging modes, alternatively, the present invention can be applied to a digital camera that is provided with a normal imaging mode that displays only an icon or name corresponding to an imaging mode for the screen for selecting the imaging modes.

Finally, while in the embodiments described above, the descriptions relate to embodiments wherein the imaging apparatus is a digital camera 1, the present invention is not limited to the examples described above, but rather the invention may be applied to mobile telephones with cameras, PDAs with cameras, PCs with cameras, digital video cameras, and the other devices, insofar as it is a device that can perform continuous imaging of a subject.

Various examples and changes may be made thereunto without departing from the broad spirit and scope of the invention. The above-described example is intended to illustrate the present invention, not to limit the scope of the present invention. The scope of the present invention is shown by the attached claims rather than the example. Various modifications made within the meaning of an equivalent of the claims of the invention and within the claims are to be regarded to be in the scope of the present invention.

The invention claimed is:

1. An imaging apparatus comprising:
   an imaging device;
   a memory which stores a plurality of imaging scenes in association with a plurality of imaging conditions; and
   a processor which is configured to:
   detect imaging conditions based on image data obtained by imaging a subject by the imaging device;

automatically select a plurality of imaging scenes from among the plurality of imaging scenes stored in the memory, based on the detected imaging conditions;

read out, from the memory, the respective imaging conditions corresponding to the automatically selected plurality of imaging scenes, and set the plurality of read-out imaging conditions as respective imaging conditions for imaging a plurality of still images; and control the imaging device to perform a plurality of still image shootings of the subject at a plurality of different timings based on the respective different set imaging conditions.

2. The imaging apparatus as set forth in claim 1, wherein the processor detects at least one of a brightness of the subject, a color tone of the subject, and an amount of movement of the subject as a parameter indicating an imaging condition.

3. The imaging apparatus as set forth in claim 1, wherein the processor is configured to:

determine a correlation between the detected imaging conditions and each of the imaging scenes stored in the memory and select the plurality of imaging scenes from among the plurality of imaging scenes stored in the memory based on the determined correlations.

4. The imaging apparatus as set forth in claim 1, further comprising:

a display;

wherein the processor is configured to control the imaging device to obtain a video of the subject until the plurality of still image shootings are performed, and perform control to display the video on the display; and wherein when the processor selects an imaging scene, the processor performs control to superimpose and display information of the selected imaging scene on the displayed video.

5. A continuous shooting imaging method for an imaging apparatus which comprises an imaging device and a memory which stores a plurality of imaging scenes in association with a plurality of imaging conditions, the method comprising:

detecting imaging conditions based on image data obtained by imaging a subject by the imaging device; and automatically selecting a plurality of imaging scenes from among the plurality of imaging scenes stored in the memory, based on the detected imaging conditions;

reading out, from the memory, the respective imaging conditions corresponding to the plurality of automatically selected imaging scenes, and setting the plurality of read-out imaging conditions as respective imaging conditions for imaging a plurality of still images; and controlling the imaging device to perform a plurality of still image shootings at a plurality of different timings based on the respective different set imaging conditions.

6. A non-transitory computer-readable recording medium having stored thereon a program that is executable by an imaging apparatus which comprises an imaging device and a memory which stores a plurality of imaging scenes in association with a plurality of imaging conditions, the program controlling the imaging apparatus to perform functions comprising:

detecting imaging conditions based on image data obtained by imaging a subject by the imaging device automatically selecting a plurality of imaging scenes from among the plurality of imaging scenes stored in the memory, based on the detected imaging conditions;

reading out, from the memory, the respective imaging conditions corresponding to the plurality of automatically selected imaging scenes, and setting the plurality of read-out imaging conditions as respective imaging conditions for imaging a plurality of still images; and controlling the imaging device to perform a plurality of still image shootings at a plurality of different timings based on the respective different set imaging conditions.

\* \* \* \* \*